United States Patent
Castañeda-Villagrán

(10) Patent No.: US 11,449,670 B2
(45) Date of Patent: *Sep. 20, 2022

(54) ITERATIVE DEVELOPMENT AND/OR SCALABLE DEPLOYMENT OF A SPREADSHEET-BASED FORMULA ALGORITHM

(71) Applicant: ScienceSheet Inc., Wilmington, DE (US)

(72) Inventor: Oscar Castañeda-Villagrán, Guatemala (GT)

(73) Assignee: ScienceSheet Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,299

(22) Filed: Dec. 26, 2020

(65) Prior Publication Data

US 2021/0117615 A1  Apr. 22, 2021

Related U.S. Application Data

(63) Continuation of application No. 16/867,659, filed on May 6, 2020, now Pat. No. 10,949,609, which is a (Continued)

(51) Int. Cl.
*G06F 17/00* (2019.01)
*G06F 40/18* (2020.01)
(Continued)

(52) U.S. Cl.
CPC ............ *G06F 40/18* (2020.01); *G06F 9/5077* (2013.01); *G06F 40/186* (2020.01); *G06N 20/00* (2019.01)

(58) Field of Classification Search
CPC ...... G06F 40/18; G06F 40/186; G06F 9/5077; G06N 20/00
See application file for complete search history.

(56) References Cited

U.S. PATENT DOCUMENTS

2006/0074824 A1* 4/2006 Li .................... G16B 40/00
                                                      706/20
2006/0112123 A1* 5/2006 Clark ................ G06F 40/18
(Continued)

OTHER PUBLICATIONS

Sarker, Interactive visual machine learning in spreadsheets, 2015, IEEE, p. 1-5 (Year: 2015).*

(Continued)

*Primary Examiner* — Andrew T McIntosh
(74) *Attorney, Agent, or Firm* — Peter Jensen-Haxel

(57) ABSTRACT

Disclosed are a method, a device, a system and/or a manufacture of iterative development and/or scalable deployment of a spreadsheet-based formula algorithm. In one embodiment, a system for scalable application of a data model defined in a spreadsheet to a dataset includes a translation server and an execution server. The translation server receives a spreadsheet file including a formula algorithm. The formula algorithm includes one or more spreadsheet formulas stored in cells. The translation server generates an extrapolated algorithm expressed in a programming language based on the formula algorithm. The execution server receives the extrapolated algorithm and the dataset and verifies calculation independence when applied to a data entry. The extrapolated algorithm is applied against the dataset. An iteration engine may continuously reapply the extrapolated algorithm to update an output data as the dataset evolves and/or receive an update to the formula algorithm and reapply the extrapolated algorithm.

20 Claims, 17 Drawing Sheets

Related U.S. Application Data continuation of application No. 16/150,262, filed on Oct. 2, 2018, now Pat. No. 10,685,175.

(60) Provisional application No. 62/575,430, filed on Oct. 21, 2017.

(51) Int. Cl.
*G06F 9/50* (2006.01)
*G06N 20/00* (2019.01)
*G06F 40/186* (2020.01)

(56) References Cited

U.S. PATENT DOCUMENTS

| | | | | |
|---|---|---|---|---|
| 2008/0243823 | A1* | 10/2008 | Baris | G06F 40/18 |
| 2010/0169758 | A1* | 7/2010 | Thomsen | G06F 40/18 |
| | | | | 715/212 |
| 2014/0164895 | A1* | 6/2014 | Matheson | G06F 40/18 |
| | | | | 715/212 |
| 2014/0372346 | A1* | 12/2014 | Phillipps | G06N 20/00 |
| | | | | 706/12 |
| 2016/0070805 | A1* | 3/2016 | Malkin | G06F 16/2228 |
| | | | | 707/754 |

OTHER PUBLICATIONS

Koci et al., A machine learning approach for layout inference in spreadsheets, 2016, SciTePress, p. 77-88 (Year: 2016).*

Kolhase et al., XLSearch: A Search Engine for Spreadsheets, ESRIG, 2013, pp. 1-12 (Year: 2013).*

Hermans et al., Automatically Extracting Class Diagrams from Spreadsheets, TUD-SERG, 2010, pp. 1-30 (Year: 2010).*

* cited by examiner

*FIG. 6*  DATA PRE-PROCESSING PROCESS FLOW

*FIG. 7*  FORMULA ALGORITHM TRANSLATION PROCESS FLOW

*FIG. 8*  EXTRAPOLATED ALGORITHM GENERATION PROCESS FLOW

FIG. 9  DATASET EVALUATION PROCESS FLOW

FIG. 10 — ALGORITHM EVALUATION PROCESS FLOW

FIG. 11   ALGORITHM MODIFICATION PROCESS FLOW

| | N | O | P | Q | R | S | T | U | V | W | X |
|---|---|---|---|---|---|---|---|---|---|---|---|
| 1 | Total txn | Total txn % | Total revenue | revenue % | Last txn | Report Date | Months since last txn | Months % (inverse) | Avg rev per txn | % | Relative Customer Value |
| 2 | 2 | 0.3 | $ 556 | 0.5 | 6/1/18 | 8/31/18 | 2 | 0.60 | $ 278 | 0.8 | 2.2 |
| 3 | 1 | 0.1 | $ 44 | 0.2 | 3/1/18 | 8/31/18 | 5 | 0.20 | $ 44 | 0.3 | 0.80 |
| 4 | 3 | 0.5 | $ 698 | 0.6 | 8/1/18 | 8/31/18 | 0 | 0.90 | $ 233 | 0.7 | 2.70 |
| 5 | 4 | 0.6 | $ 828 | 0.7 | 6/1/18 | 8/31/18 | 2 | 0.60 | $ 207 | 0.6 | 2.50 |
| 6 | 4 | 0.6 | $ 223 | 0.3 | 7/1/18 | 8/31/18 | 1 | 0.70 | $ 56 | 0.4 | 2.00 |
| 7 | 1 | 0.1 | $ 9 | 0.1 | 5/1/18 | 8/31/18 | 3 | 0.30 | $ 9 | 0.1 | 0.60 |
| 8 | 2 | 0.3 | $ 830 | 0.8 | 6/1/18 | 8/31/18 | 2 | 0.60 | $ 415 | 0.9 | 2.60 |
| 9 | 8 | 0.9 | $ 256 | 0.4 | 8/1/18 | 8/31/18 | 0 | 0.90 | $ 32 | 0.2 | 2.40 |
| 10 | 5 | 0.8 | $ 980 | 0.9 | 3/1/18 | 8/31/18 | 5 | 0.20 | $ 196 | 0.5 | 2.40 |

205O =PERCENTRANK.EX ($N$2:$N$10,N2,3)

205P =SUM(H2:M2)

205N =SUM(B2:G2)

205Q =PERCENTRANK.EX ($P$2:$P$10,P2,3)

205R =INDEX($1:$1,0,SUM PRODUCT(MAX((B2:G2>0) *COLUMN(B2:G2))))

205S =EOMONTH (TODAY(),-1)

205T =MONTH(S2)- MONTH(R2)

205U =1-PERCENTRANK.EXC ($T$2:$T$10,T2,3)

205V =P2/N2

205W =PERCENTRANK.EXC ($V$2:$V$10,V2,3)

205X =O2+Q2+U2+W2

FORMULA ALGORITHM 206

=PERCENTRANK.EXC({SUM(B2:G2),SUM(B3:G3),-
{SUM(B4:G4)-SUM(B5:G5),SUM(B6:G6),SUM(B7:G7),SUM(B8:G8),SUM(B9:G9),SUM(B10:G10)},SUM(B2:G2),3)+PERCENTRANK.EXC(SUM(H2:M2),SUM(H3:M3),SUM(H4:M4),SUM(H5:M5),SUM(H6:M6),SUM(H7:M7),SUM(H8:M8),SUM(H9:M9),SUM(H10:M10),P2,3)+1-PERCENTRANK.EXC({MONTH(EOMONTH(TODAY(),-1))-MONTH(=INDEX($1:$1,0,SUMPRODUCT(MAX((B2:G2>0)*COLUMN(B2:G2)))),MONTH(EOMONTH(TODAY(),-1))-MONTH(=INDEX($1:$1,0,SUMPRODUCT(MAX((B3:G3>0)*COLUMN(B3:G3)))),MONTH(EOMONTH(TODAY(),-1))-MONTH(=INDEX($1:$1,0,SUMPRODUCT(MAX((B4:G4>0)*COLUMN(B4:G4)))),MONTH(EOMONTH(TODAY(),-1))-MONTH(=INDEX($1:$1,0,SUMPRODUCT(MAX((B5:G5>0)*COLUMN(B5:G5)))),MONTH(EOMONTH(TODAY(),-1))-MONTH(=INDEX($1:$1,0,SUMPRODUCT(MAX((B6:G6>0)*COLUMN(B6:G6)))),MONTH(EOMONTH(TODAY(),-1))-MONTH(=INDEX($1:$1,0,SUMPRODUCT(MAX((B7:G7>0)*COLUMN(B7:G7)))),MONTH(EOMONTH(TODAY(),-1))-MONTH(=INDEX($1:$1,0,SUMPRODUCT(MAX((B8:G8>0)*COLUMN(B8:G8)))),MONTH(EOMONTH(TODAY(),-1))-MONTH(=INDEX($1:$1,0,SUMPRODUCT(MAX((B9:G9>0)*COLUMN(B9:G9)))),MONTH(EOMONTH(TODAY(),-1))-MONTH(=INDEX($1:$1,0,SUMPRODUCT(MAX((B10:G10>0)*COLUMN(B10:G10)))),T2,3)+PERCENTRANK.EXC(SUM(H2:M2)/SUM(B2:G3),SUM(H3:M3)/SUM(B3:G3),SUM(H4:M4)/SUM(B4:G4),SUM(H5:M5)/SUM(B5:G5),SUM(H6:M6)/SUM(B6:G6),SUM(H7:M7)/SUM(B7:G7),SUM(H8:M8)/SUM(B8:G8),SUM(H9:M9)/SUM(B9:G9),SUM(H10:M10)/SUM(B10:G10)},V2,3)

FIG. 14

SPREADSHEET FORMULA 205AS

=IF(AJ2<=6,COUNT(IF(COUNTA(OFFSET($A2,0,
(MATCH(AK2,$AJ$2:$AJ$35),1,2))>1,1,0),IF(COUNTA(OFFSET($A2,0,SUM(MATCH(AK2,$AJ$2:$AJ$35),1,1,2))>1,1,0),IF(COUNTA(OFFSET($A2,0,SUM(MATCH(AK2,$AJ$2:$A...

```scala
import org.apache.spark.sql._
import org.apache.spark.sql.functions._
import scala.util.Try //************
//The following code was generated for this spreadsheet formula:
//=IF(AJ2<=6,COUNT(IF(COUNTA(OFFSET($A2,0,
(MATCH(AK2,$AJ$2:$AJ$35),1,2))>1,1,0),IF(COUNTA(OFFSET($A2,0,SUM(MATCH(AK2,$AJ$2:$AJ$35),1,1,2))>1,1,0),IF(COUNTA(OFFSET($A2,0,SUM(MATCH(AK2,$AJ$2:$AJ$35),3),1,2))>1,1,0),IF(COUNTA(OFFSET($A2,0,SUM(MATCH(AK2,$AJ$2:$AJ$35),4),1,2))>1,1,0),IF(COUNTA(OFFSET($A2,0,SUM(MATCH(AK2,$AJ$2:$AJ$35),5),1,2))>1,1,0)))
//************
val sum_10 = matchColumn1(DFname.coalesce(1), "1", "AK2", "AJ2", "AJ35", "ROWLOOKUP", "input_matchColumn12", "output_matchColumn12")
sum_10.createOrReplaceTempView("sum_10")
val offset_12 = sumColumn1(DFname.coalesce(1), "1", "sum_10", "lit(5)", "input_sumColumn10", "output_sumColumn10")
offset_12.createOrReplaceTempView("offset_12")
val counta_12 = offsetColumn(DFname.coalesce(1), "A2", "lit(0)", "lit(1)", "lit(2)", "input_offsetColumn12", "output_offsetColumn12")
counta_12.createOrReplaceTempView("counta_12")
val if_14 = countaColumn(DFname.coalesce(1), "1", "input_countaColumn12", "output_countaColumn12", "counta_12")
if_14.createOrReplaceTempView("if_14")
val count_7 = ifColumn(DFname.coalesce(1), "1", "if_14*1", "lit(1)", "lit(0)", "input_ifColumn14", "output_ifColumn14")
count_7.createOrReplaceTempView("count_7")
val sum_9 = matchColumn1(DFname.coalesce(1), "1", "AK2", "AJ2", "AJ35", "ROWLOOKUP", "input_matchColumn11", "output_matchColumn11")
sum_9.createOrReplaceTempView("sum_9")
```

EXTRAPOLATED ALGORITHM 322A
(OF SPREADSHEET FORMULA 205(AS))

FIG. 15

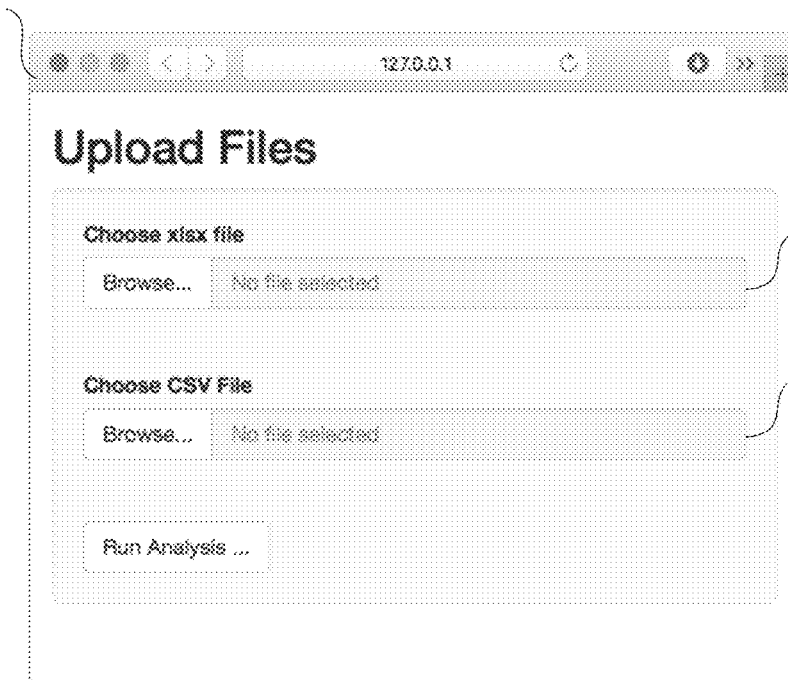
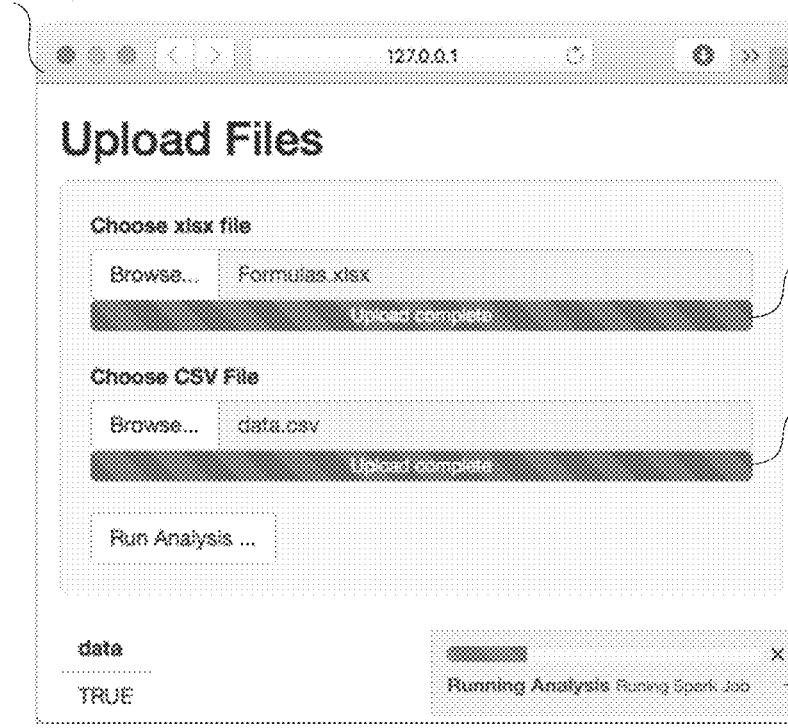
*FIG. 16*

US 11,449,670 B2

ITERATIVE DEVELOPMENT AND/OR SCALABLE DEPLOYMENT OF A SPREADSHEET-BASED FORMULA ALGORITHM

CLAIMS OF PRIORITY AND CROSS REFERENCES TO RELATED APPLICATIONS

This patent application is a continuation of, claims priority from, and hereby incorporates by reference: U.S. utility patent application Ser. No. 16/867,659, titled 'APPLICATION OF A SPREADSHEET FORMULA ALGORITHM AGAINST A DATASET SUCH AS A LARGE EXTERNAL DATA SOURCE', filed May 6, 2020, which in turn claims priority from U.S. utility patent application Ser. No. 16/150,262, titled 'DATA ANALYSIS AND PREDICTION OF A DATASET THROUGH ALGORITHM EXTRAPOLATION FROM A SPREADSHEET FORMULA', filed Oct. 2, 2018, which in turn claims priority from U.S. provisional patent application No. 62/575,430, titled 'DATA ANALYSIS AND PREDICTION OF A DATASET THROUGH ALGORITHM EXTRAPOLATION FROM A SPREADSHEET FORMULA', filed Oct. 21, 2017.

FIELD OF TECHNOLOGY

This disclosure relates generally to data processing and more particularly, to a method, a device, a system and/or a manufacture of iterative development and/or scalable deployment of a spreadsheet-based formula algorithm.

BACKGROUND

A relatively large number of analysts may be proficient in utilizing spreadsheet applications to carry out data analysis, for example Microsoft® Excel, Apple® Numbers, or Google® Sheets. An analyst for example may be a statistician, an engineer, or a scientist, but may be more commonly a sales or marketing professional, an accountant, or other business analyst. More than any other time there are opportunities to mine or derive insight or businesses intelligence from a dataset. The dataset for example may be a large dataset with information about customers, financial transactions, social interactions (e.g., messages or connections on social media), ecological data, medical data, and similar datasets. For example, one can define a model which takes in data of a customer information dataset, applies a set of formulas and/or algorithms, and which outputs a prediction metric for lifetime customer value or a relative value score.

However, these datasets can be quite large and difficult to work with. The analyst may have difficulty getting the data in a usable form. For example, Excel® may have difficulty with 60,000 rows of data. The analyst may be unsure what existing model to apply, how to propose a new model, and how to prototype the model. Attempts to apply the model to a dataset may result in errors or freezes in the spreadsheet application, or a complete crash of a computing device of the analyst.

Rather, to work with the dataset effectively certain skill may be required. For example, a 'big data' analyst may be needed. The big data analyst may possess such skills as: fluency in structured query language (SQL) to access and curate the dataset from a database, proficiency in a programming language (e.g., Python) to build the model, knowledge of Hadoop® and/or Mapreduce methods to apply the model to the dataset, and even an understanding of cloud computing infrastructure to achieve fast and/or efficient results.

Much of the work of the big data analyst may occur on a command line interface. The big data analyst may have advanced degrees, may be in high demand, may command a significant salary, and ultimately may be difficult to hire.

As a result, analysts without specialized skill may have difficulty analyzing datasets, even when they are otherwise qualified or expert at analyzing data. Organizations such as companies may have difficulty deriving meaning, intelligence, or value from their data, causing missed opportunities, slower growth, and organization-wide value decline.

SUMMARY

Disclosed are a method, a device, a system and/or a manufacture of application of iterative development and/or scalable deployment of a spreadsheet-based formula algorithm. In one embodiment, a method of scaling spreadsheet data analysis includes processing a spreadsheet file including a formula algorithm to be applied to a dataset having two or more data entries. The formula algorithm outputs a dependent variable and accepts as inputs one or more independent variables. The formula algorithm including one or more spreadsheet formulas stored in a first set of one or more cells of the spreadsheet file, the one or more independent variables referenced from the first set of one or more cells of the spreadsheet file, and the dependent variable output in a cell of the spreadsheet file.

The method generates from the formula algorithm an extrapolated algorithm expressed in a programming language that is a query language, an interpreted programming language, and/or a functional programming language. Each of the one or more spreadsheet formulas are equivalent to one or more functions of the programming language and each of the one or more independent variables define a declared variable of at least one of the one or more functions of the programming language.

The method verifies calculation independence of a data entry of the dataset when the extrapolated algorithm to be applied to two or more data entries of the dataset is applied to the data entry. The data entry of the two or more data entries are determined to reference data of a different data entry of the two or more data entries. The data of the different data entry is replicated into the data entry to ensure calculation independence of the data entry. The method then applies the extrapolated algorithm against the dataset utilizing parallel processing to generate an output data including a value for the dependent variable calculated for each of the two or more data entries of the dataset.

The method may provision a computing virtual machine and/or a computing process container, and the output data may be stored in the computing virtual machine and/or the computing process container. The computing process container may be communicatively coupled to an application programming interface (API) of a visualization application. The spreadsheet file may also be accessed as a software-as-a-service through a browser application.

The method may process an extra-spreadsheet instruction stored in a third set of one or more cells of the spreadsheet file to run a data analysis, report the output data to a user, parametrize the formula algorithm, and/or parameterize at least one of the one or more independent variables.

An automatic machine learning process may be run to automatically apply one or more predictive models to the dataset. A predictive model of the one or more predictive models may be determined to fit the dataset. The extrapolated algorithm may be modified in response to an application of the one or more predictive models to the dataset, resulting in a modified extrapolated algorithm. The modified extrapolated algorithm may be reapplied against the dataset to adjust a data model for analyzing the dataset.

The calculation independence may be based on a syntax format. The syntax format may confine data of the data entry to a row of the spreadsheet file, with each instance of a cell of the row comprising a null, an independent variable of the one or more independent variables, the dependent variable, a spreadsheet formula of the one or more spreadsheet formulas, the extra-spreadsheet instruction, and/or an analysis instruction. The syntax format may also confine to the row of the spreadsheet file the one or more spreadsheet formulas including the formula algorithm.

The output data re-combined from data may include a first output block generated through parallel processing resulting in one or more additional output blocks. The programming language may include a structured query language (SQL). A format of the spreadsheet file may be: .123, .12M, ._XLS, ._XLSX, .AST, .AWS, .BKS, .CELL, .DEF, .DEX, .DFG, .DIS, .EDX, .EDXZ, .ESS, .FCS, .FM, .FODS, .FP, .GNM, .GNUMERIC, .GSHEET, .HCDT, .IMP, .MAR, .NB, .NCSS, .NMBTEMPLATE, .NUMBERS, .NUMBERS-TEF, .ODS, .OGW, .OGWU, .OTS, .PMD, .PMDX, .PMV, .PMVX, .QPW, .RDF, .SDC, .STC, .SXC, .TMV, .TMVT, .UOS, .WKI, .WKQ, .WKS, .WKU, .WQ1, .WQ2, .WR1, .XAR, .XL, .XLR, .XLS, .XLSB, .XLSHTML, .XLSM, .XLSMHTML, .XLSX, .XLTHTML, .XLTM, and .XLTX.

In another embodiment, a method for scalable iterative data analysis utilizing a spreadsheet includes processing a spreadsheet file including a prototype data and a formula algorithm. The prototype data includes a data entry imported from a dataset having two or more data entries, the data entry including one or more pieces of data. The formula algorithm defines a data model for analyzing the dataset.

The formula algorithm outputs a dependent variable and accepts as inputs the one or more pieces of data of the data entry as one or more independent variables. The formula algorithm includes one or more spreadsheet formulas stored in one or more cells of the spreadsheet file, the one or more independent variables referenced from one or more cells of the spreadsheet file, and the dependent variable output in a cell of the spreadsheet file.

The method recognizes a syntax format with which the formula algorithm is organized in the spreadsheet file. The one or more spreadsheet formulas, the one or more independent variables, and the dependent variable are stored to permit independent calculation of the dependent variable for each of the two or more data entries of the dataset.

A first extrapolated algorithm expressed in one or more programming languages is generated from the formula algorithm. Each spreadsheet formula is equivalent to one or more functions of at least one of the one or more programming languages, and each of the one or more independent variables define a declared variable of at least one of the one or more functions of at least one of the one or more programming languages. The method applies the first extrapolated algorithm against the dataset utilizing parallel processing to generate an output data including a value for the dependent variable calculated for each of the two or more data entries of the dataset.

An update is received to the formula algorithm and/or the first extrapolated algorithm to generate a modified extrapolated algorithm adjusting the data model for analyzing the dataset. The modified extrapolated algorithm is then reapplied against the dataset.

The method may continuously reapply the first extrapolated algorithm against the dataset to update the output data as the dataset evolves. The output data and/or a visualization data of the output data may be transmitted to a client device of a user. Reapplying the first extrapolated algorithm against the dataset to update the output data may occur at a time interval.

In yet another embodiment, a system for scalable application of a data model defined in a spreadsheet to a dataset includes a translation server, an execution server, and a network communicatively coupling the translation server and the execution server.

The translation server includes a processor of the translation server and a memory of the translation server. The memory of the translation server includes computer readable instructions that when executed on the processor of the translation server receive a spreadsheet file including a formula algorithm and a data entry of the two or more data entries of the dataset. The formula algorithm includes one or more spreadsheet formulas stored in one or more cells of the spreadsheet file, one or more pieces of data of the data entry stored as one or more independent variables referenced from one or more cells of the spreadsheet file, and a dependent variable output in a cell of the spreadsheet file. The one or more spreadsheet formulas, the one or more independent variables, and the dependent variable permit independent calculation of a value of the dependent variable at least one of the two or more data entries of the dataset.

The memory of the translation server also includes computer readable instructions that when executed on the processor of the translation server generate an extrapolated algorithm expressed in a programming language based on the formula algorithm and submit the extrapolated algorithm for calculation of the value of the dependent variable for each of the two or more data entries of the dataset through parallel processing. Each instance of the one or more spreadsheet formulas are equivalent to one or more functions of the programming language.

The execution server includes a processor of the execution server and a memory of the execution server. The memory of the execution server includes computer readable instructions that when executed on the processor of the execution server: (i) receive the extrapolated algorithm expressed in the programming language; (ii) receive the dataset including the two or more data entries as an input to the extrapolated algorithm; (iii) verify calculation independence of the extrapolated algorithm to be applied against the dataset; (iv) apply the extrapolated algorithm against the dataset; and (v) generate an output data including the value for the dependent variable of each instance of the two or more data entries within the dataset.

The execution server may further include an iteration engine including computer readable instructions that when executed on the processor of the execution server receive an update to the formula algorithm and/or the extrapolated algorithm adjusting the data model for analyzing the dataset resulting in generation of a modified extrapolated algorithm. The iteration engine may include computer readable instructions that when executed on the processor reapply the modified extrapolated algorithm against the dataset. The iteration engine may also or alternatively include computer readable instructions that when executed on the processor of the execution server continuously reapply the extrapolated algorithm against the dataset to update the output data as the dataset evolves. The system may further include a computing device that includes a memory of the computing device storing the dataset that includes the two or more data entries, a client device, and/or a model server.

BRIEF DESCRIPTION OF THE DRAWINGS

The present embodiments are illustrated by way of example and not limitation in the figures and the accompanying text, in which like references may indicate similar elements and in which:

FIG. 1 illustrates generation of an extrapolated algorithm from a spreadsheet file comprising a formula algorithm defining a data model and/or one or more prediction metrics, a client device transmitting the spreadsheet file to a translation server for generation of the extrapolated algorithm from the spreadsheet with a code generation engine, the extrapolated algorithm optionally modifiable on a model server and/or modified by an AutoML engine before being applied to and/or run against a dataset on an execution server that may include a computing cluster to generate an output and/or a prediction value, according to one or more embodiments.

FIG. 12 illustrates an example embodiment of a prototype data with nine data entries each comprising values for independent variables of data, the prototype data utilized in a spreadsheet file to model a prediction metric that is a relative customer value score utilizing a set of spreadsheet formulas to define the formula algorithm, according to one or more embodiments.

FIG. 13 illustrates the spreadsheet formulas of FIG. 12 and a resulting formula algorithm from a model definition, according to one or more embodiments.

FIG. 14 is an another example of a spreadsheet file that includes a set of formulas algorithms in a plurality of cells each defining a prediction metric and together comprising the formula algorithm, the spreadsheet file for example defining a business analysis model as modeled by a data analyst with a prototype data of the dataset, according to one or more embodiments.

FIG. 15 is an example of the translation of the formula algorithm of FIG. 14 into an extrapolated algorithm of the formula algorithm (e.g., in the embodiment of FIG. 15, Scala code to be applied against an Apache® Spark Cluster), according to one or more embodiments.

FIG. 16 illustrates an interface for receiving the dataset and the spreadsheet file that comprises the formula algorithm and submitting the dataset and the formula algorithm to the translation server of FIG. 3, the execution server of FIG. 4, and/or the model server of FIG. 5, according to one or more embodiments.

DETAILED DESCRIPTION

Example embodiments, as described below, may be used to provide a method, a system a device, and/or a manufacture of iterative development and/or scalable deployment of a spreadsheet-based formula algorithm.

Figure 1:
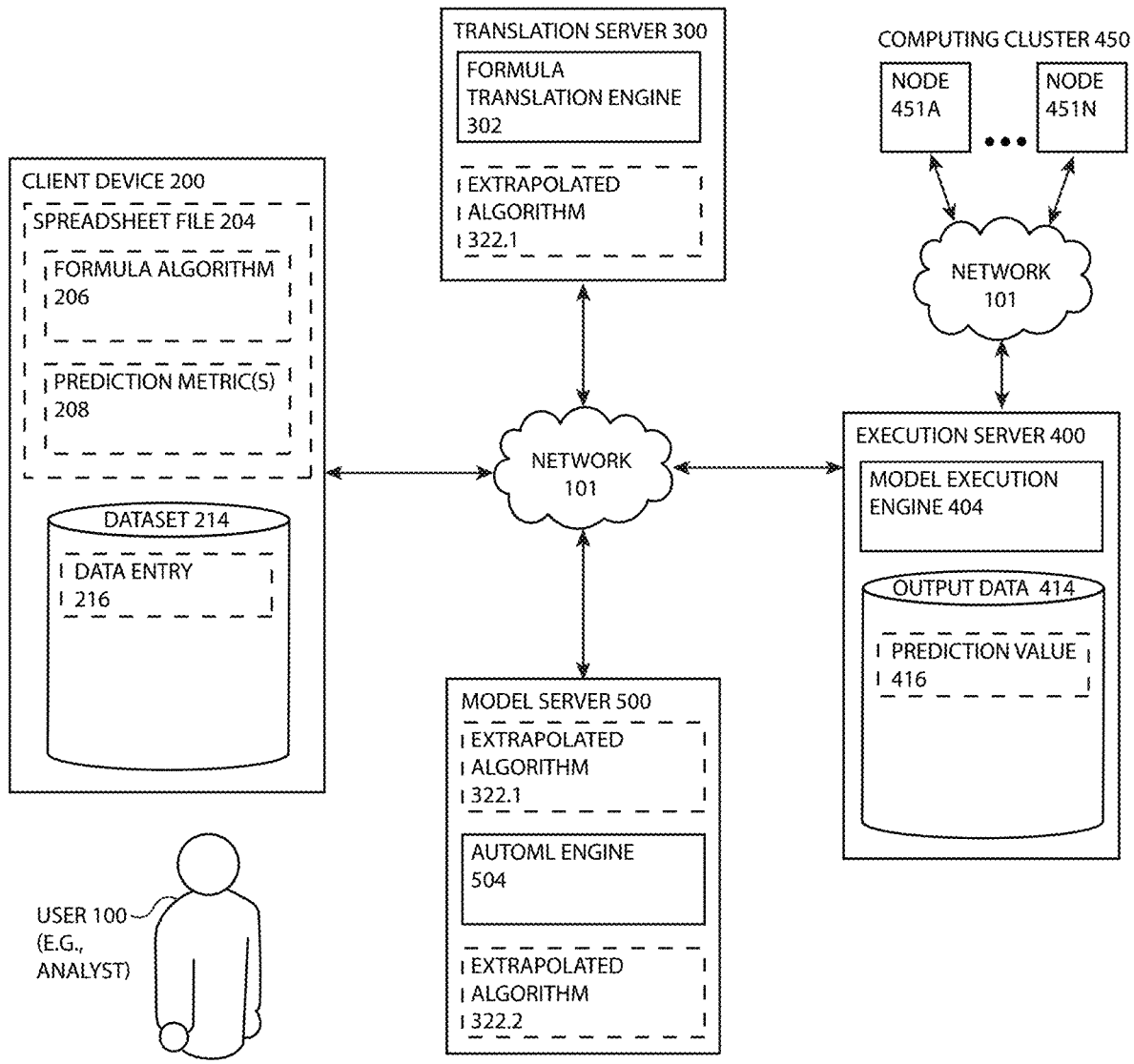
FIG. 1 illustrates a network for a user, using a spreadsheet application, to propose data models, define prediction metrics, and view, work with, analyze and/or derive insight from a dataset that may be large and/or stored in a format or language the user does not have sufficient expertise to utilize. Specifically.

FIG. 1 illustrates a network for permitting a user 100 to use a spreadsheet application 202 to propose data models, define prediction metrics, and view, work with, analyze and/or derive insight from a dataset 214. The dataset 214 may be large (e.g., too large for the spreadsheet application 202 to effectively work with and/or compute), or may be stored in a way that may be difficult for the user 100 to access or propose models (e.g., the user 100 may not have sufficient skill to write a complex algorithm in Python or an SQL query). Specifically, FIG. 1 illustrates generation of an extrapolated algorithm 322 from a spreadsheet file 204 comprising a formula algorithm 206 (the formula algorithm 206 may define a data model, a data analysis model and/or one or more prediction metrics 208 as outputs of the data model), according to one or more embodiments. A client device 200 transmits the spreadsheet file 204 comprising the formula algorithm 204 to a translation server 300 over the network 101 for generating of the extrapolated algorithm 322 from the spreadsheet file 204 with a formula translation engine 302 and/or the code generation engine 306. The extrapolated algorithm 322 may be modified on a model server 500 and/or modified by an AutoML engine 504 before application against a dataset 214 on an execution server 400. The execution server 400 may segment the dataset 214 into computing blocks 407 to be run on a computing cluster 450, which may generate an output data 414 as recombined output blocks 409, the output data 414, prediction values 416 of the one or more prediction metrics 208, according to one or more embodiments.

In the embodiment of FIG. 1 the user 100 may generate and work with a spreadsheet file 204 utilizing the client device 200. The spreadsheet file 204 is generated and/or read by the spreadsheet application (e.g., the spreadsheet application 202 or FIG. 2). The associated file format read by the spreadsheet application 202 may be, for example, Microsoft® Excel, Apple® Numbers, Google® Sheets, or another spreadsheet application. The user 100 defines a formula algorithm 206 within one or more cells of the spreadsheet file 204 with a uniform syntax (e.g., the syntax format), as described further in conjunction with the embodiment of FIG. 2, the example of FIG. 14, and throughout the present embodiments. The formula algorithm 206 comprises one or more spreadsheet formulas 205 defined in a spreadsheet language of the spreadsheet application 202. The client device 200 may be, for example, a desktop computer, a notebook computer, a tablet, a smartphone, or another data processing device sufficient for running the spreadsheet application 202.

The user 100 transmits the spreadsheet file 204 with the formula algorithm 206 through the network 101 to the translation server 300. Alternatively, the user 100 may just submit the formula algorithm 206. The user 100 may, for example, automatically transmit the spreadsheet file 204 and/or the formula algorithm 206 to the translation server 300 via a plugin to the spreadsheet application 202 or via an upload screen as shown in the embodiment of FIG. 16. The network 101 may be the Internet, an intranet, a wide area network, a virtual private network, and/or a local area network. Each of the servers of FIG. 1 (including the translation server 300, the execution server 400, the computing cluster 450, and the model server 500) comprises one or more server computers, for example running in a data center and/or running on a cloud computing platform (e.g., Amazon® Web Services, Microsoft® Azure).

The translation server 300 receives the spreadsheet file 204 and may utilize a formula translation engine 302 to convert the formula algorithm 206 to an extrapolated algorithm 322. Alternatively or in addition, the translation server 300 may utilize a parse tree generator 306 and a code generation engine 318 to translate the formula algorithm 206 into the extrapolated algorithm 322. The extrapolated algorithm 322 may be a substantially equivalent algorithm in one or more target programming languages. The target programming language may include a query language, an interpreted programming language, and/or a functional programming language. For example, the target language may be structured query language (SQL), Python, or Scala. Additional aspects of the generation of the extrapolated algorithm 322 are shown and described in conjunction with FIG. 3, and the process flows of FIG. 7 and FIG. 8.

The extrapolated algorithm 322 may be generated in a first instance, shown in FIG. 1 as the extrapolated algorithm 322.1. The user 100 may wish to refine the extrapolated algorithm 322 once generated. The model server 500 may receive the extrapolated algorithm 322.1 and display it to the user 100 for direct manual modification. Alternatively or in addition, an AutoML engine 504 (which may be an engine for an automatic machine learning process) may analyze a structure of the extrapolated algorithm 322.1 and/or propose a new algorithm that may be a substantially similar algorithm, a different algorithm, and/or an alternative algorithm for the user 100 to apply to the dataset 214. Additionally, a parameter tuning engine 506 and a formula reduction engine 508 may be utilized to modify the extrapolated algorithm 322, as shown and described in conjunction with FIG. 3 and FIG. 11. The modified and/or the new algorithm is referred to as the extrapolated algorithm 322.2. The AutoML engine 504 is further shown and described in conjunction with the embodiment of FIG. 3.

The extrapolated algorithm 322.1 and/or the extrapolated algorithm 322.2 may be transmitted to the execution server 400 comprising the dataset 214. The dataset 214 may be data in a database (e.g., an SQL database, a NoSQL database, the spreadsheet application, a file such as a .csv file), one or more pools of stored data in multiple databases, a dynamic dataset (that may, for example be constantly updating from live events) and/or a static dataset (e.g., a data snapshot). The execution server 400 receives the extrapolated algorithm 322 (e.g., either the extrapolated algorithm 322.1 and/or 322.2) and utilizes the model execution engine 404 to apply the extrapolated algorithm 322 to the dataset 214. The model execution engine 404 may segment the dataset 214 into two or more computing blocks 407 for submission to the computing cluster 450 to be processed in parallel, returned as two or more corresponding output blocks 409, and assembled into the output data 414. In the case of a Spark cluster, the computing blocks 407 may also be referred to as a "partition."

The output data 414 may include, for each data entry 216 of the dataset 214, the prediction values 416 associated with the prediction metric 208. Additional post-processing of the output data 414 and/or the prediction value 416 is shown and described in conjunction with FIG. 4, but for example may include a visualization data 412 that helps the user 100 to derive insight and/or business intelligence from the dataset 214. The output data 414 is provided to the user 100, for example on the client device 200 via a web interface of a web browser, via a client application, and/or directly within the spreadsheet application 202 via the plugin of the spreadsheet application 202. Additional processes may be initiated, for example the spawning and/or spinning up of a virtual computing machine (VM), a data container (e.g., Docker® container), or a microservice (e.g., a block of running code with access to the output data attached to an event bus such Kafka®. The additional process may be accessible through an application programming interface (API), including over the network 101.

The user 100 may continuously adjust and tune a model and/or the prediction metrics 208 embodied in the formula algorithm 206 to iterate and refine a data analysis model. As shown and described in conjunction with FIG. 4, an iteration engine 410 may continuously (e.g., at predefined intervals, such as once per hour or once per second) apply the version of the extrapolated algorithm 322 to continuously update the output data 414, including any updates to the formula algorithm 206 and/or the extrapolated algorithm 322 that the user 100 may make following initial generation of the output data 414. The user 100 may also potentially tune the formula algorithm 206 and/or extrapolated algorithm 322 as shown and described in conjunction with the process flow of FIG. 10. For example, where the dataset 214 is a blockchain data (e.g., Bitcoin, Ethereum, etc.), the dataset 214 may be continuously and/or periodically imported from a node of a blockchain network and the extrapolated algorithm 322 applied (e.g., when each new block of the blockchain is solidified in the blockchain data structure). For example, the prediction metric 208 may be "what is the probability a cryptocurrency value associated with a public key on the blockchain network will transact in the next block."

In one or more embodiments the user 100, who may be an analyst predominantly familiar with and/or skilled at using a spreadsheet application 202, may be able to propose a relatively complex data model, data analysis model, and/or prediction metric 208 via the formula algorithm 206. For example, the spreadsheet application 204 may have a simplified interface compared to a command line or writing code in a programming language, may have a simplified language (e.g., the Excel® 'SUM' formula), and a fast and intuitive way to work with the prototype data 210. The user 100 may also be able to apply the formula algorithm 206, even when relatively simple, to a large instance of the dataset 214 that may otherwise be difficult to work with in the spreadsheet application 202 (e.g., it may be difficult, processor intensive, and/or time consuming for the spreadsheet application 202 to operate on, for example, 50,000 rows of data, 5,000,000 rows of data, 9000 rows of data with 7000 columns each, etc.).

Figure 2:
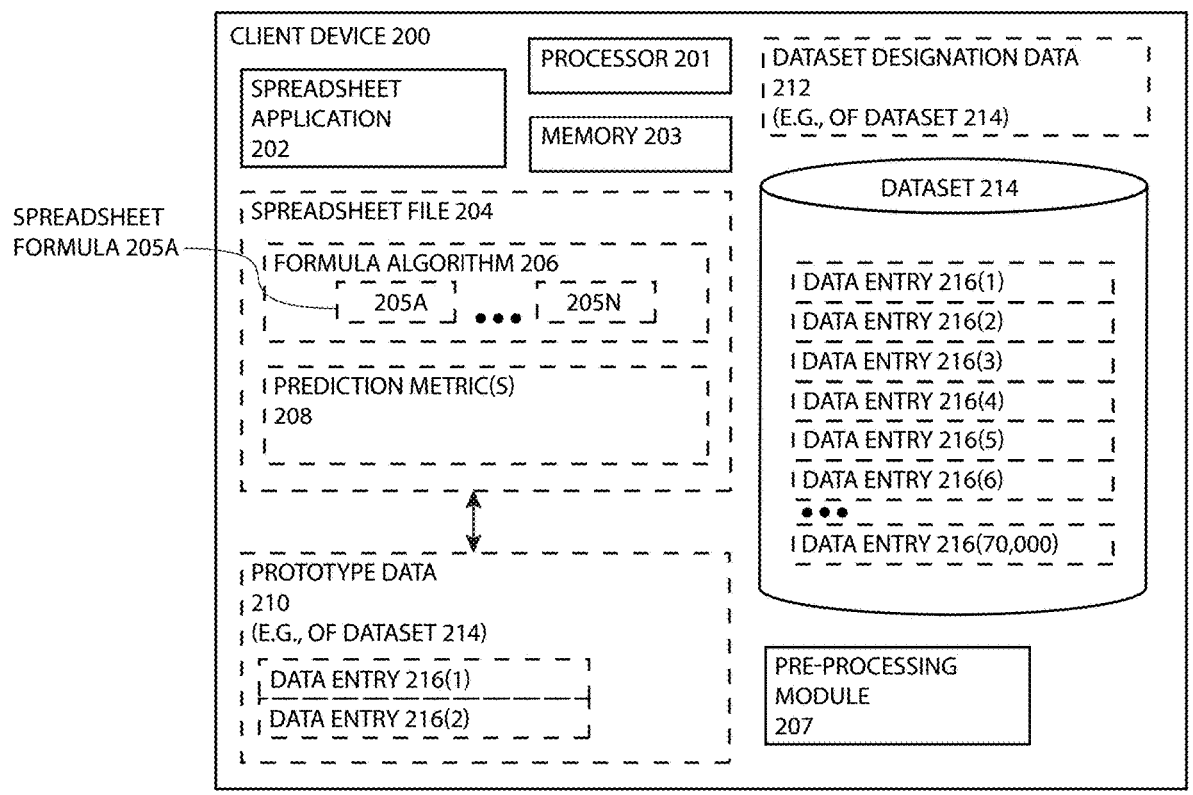
FIG. 2 illustrates the client device of FIG. 1, including a spreadsheet application generating the spreadsheet file, a formula algorithm comprising one or more spreadsheet formulas defined in one or more cells of the spreadsheet file, one or more prediction metrics as the output of the formula algorithm defined in a cell of the spreadsheet formula, a dataset with one or more data entries, and a prototype data of the dataset, according to one or more embodiments.
Figure 14:
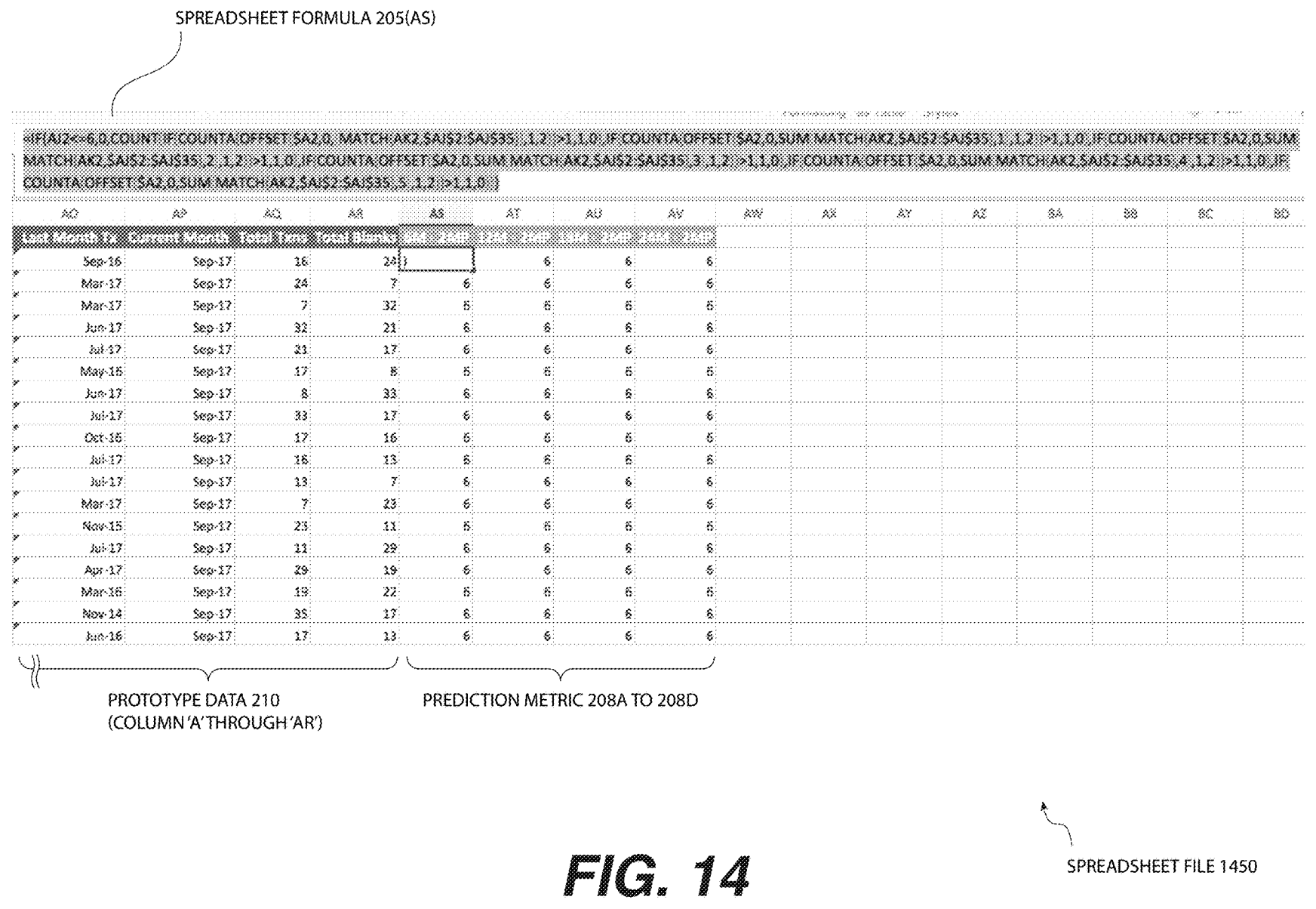

FIG. 2 illustrates the client device 200 of FIG. 1, including a spreadsheet application 202 for generating the spreadsheet file 204, the formula algorithm 206 defined in one or more cells (e.g., comprised of a number of individual instance of a spreadsheet formula 205 of the spreadsheet file 204, as shown in a cell 1202 of FIG. 14), the one or more prediction metrics 208, and a prototype data 210 of the dataset 214 the execution server 400, according to one or more embodiments. The client device 200 is a computing device that includes a processor 201 and a memory 202 (e.g., a random-access memory, a solid-state memory, a memrister). The client device 200 comprises and runs the spreadsheet application 202, for example Microsoft® Excel.

The spreadsheet file 204 is defined in a file format readable and editable by the spreadsheet application 202. For example, where the spreadsheet application 202 is Microsoft® Excel the file format of the spreadsheet application 202 may be .xls and/or .xlsx. The spreadsheet application 204 may also be accessed as software-as-a-service (SAAS) (e.g., Google Sheets). For example, the spreadsheet application 202 may be accessed through a web browser application that may export to a common data format (e.g., .xls and/or .csv).

The spreadsheet file 204 defines a formula algorithm 206 that can accept data of a data entry 216 of the dataset 214. The formula algorithm 206 comprises one or more independent variables stored in cells of the spreadsheet file (e.g., references to the cells having the independent variables (e.g., the independent variables 1204)). The formula algorithm 206 outputs a prediction metric 208 as a dependent variable (e.g., the dependent variable 1206) in a cell (e.g., the cell 1202) of the spreadsheet file 204. The formula algorithm 206 further comprising one or more spreadsheet formulas 205 stored in one or more cells of the spreadsheet file 204.

The formula algorithm 206 is therefore one or more formulas defined within the language of the spreadsheet application 202, and defined in one or more cells as a collection of one or more spreadsheet formulas 205. For example, the formula algorithm 206 may be comprised of one or more spreadsheet formulas 205, shown in the embodiment of FIG. 2 as spreadsheet formula 205A through spreadsheet formula 205N. The formula algorithm 206 may include references to other cells and/or may comprise compound formulas (e.g., nested formulas and/or references). For example, a compound formula may be a formula that calls other formulas as parameters and so is arranged in a functional call-style fashion, e.g. SUM(COUNT(A), COUNT(B)). Another example of a compound formula is shown in conjunction with the embodiments of FIG. 12, FIG. 13, FIG. 14 and FIG. 15.

The formula algorithm 206 defines an output that is one or more prediction metrics 208 as a dependent variable. In a specific example, the formula algorithm 206 may be a relatively simple transformation of data (e.g., a SUM of several cells), or may form a complex model that may weight several factors to predict a behavior of an entity associated with the data. In a further example, the data analysis model embodied in the formula algorithm 206 may analyze data of a customer (e.g., a single customer's data may be organized in a row of the spreadsheet) to result in a lifetime value of the customer or a predicted behavior of the customer (e.g., an instance of the prediction metric 208), as shown and described in conjunction with FIG. 12 and FIG. 15. Similarly, each row may represent a financial transaction, with the formula algorithm 206 generating an output that is a prediction metric 208 for whether the transaction was fraudulent.

The formula algorithm 206 is organized according to a syntax format that may be predefined and/or that is recognizable by the client device 200. In one or more embodiments, the syntax format permits independent calculations of each data entry 216 within the dataset 214 such that submitting the extrapolated algorithm 322 and a single data entry 216 (e.g., the data entry 216(1)) of the dataset 214 results in the one or more prediction values 416 of the single data entry 216. In one or more embodiments, a columnar data syntax is utilized whereby one or more columns of a single row of a spreadsheet defines the formula algorithm 206, as shown and described in conjunction with the embodiment of FIG. 14. However, many other pre-agreed syntaxes are possible, including the use of template spreadsheets the user 100 may modify.

The user 100 may define the formula algorithm 206 on sample data referred to as the prototype data 210. For example, the user 100 may review the prototype data 210 and then begin to define the model as a series of spreadsheet formulas 205 stored in cells of the spreadsheet file 204 and making references (e.g., using as inputs) data of the prototype data 210 stored in cells of the spreadsheet file 204. In one or more embodiments, the prototype data 210 may be drawn from the dataset 214. For example, where the dataset 214 includes 100,000 records (e.g., 100,000 data entries 216), the prototype data 210 may include 50 records. The data may also be automatically imported into the spreadsheet from another source. For example, the pre-processing module 207 comprises computer readable code that when executed on the processor 201 carries out one or more of the processes of FIG. 6, which may draw in data from an external source and place it in the spreadsheet file 204 according to a syntax format.

The prototype data 210 may help the user 100 to build the formula algorithm 206, for instance by permitting the user 100 to work with a representative sample of data the user 100 knows to have both high value and low value customers, so that the user 100 can attempt to model a score for the customers. This approach may help to build the data analysis model intuitively, for example by observing the results of the prediction metrics 208 defined by the formula algorithm 206 on sample data. The client device 200 may further comprise a dataset designation data 412 that specifies which data (i.e., the dataset 214) the formula algorithm 204 is to be applied against. For example, the dataset designation data 412 may be a UID of the dataset 214 and/or its constituent elements, for instance database identifiers or address over the network 101.

Figure 3:
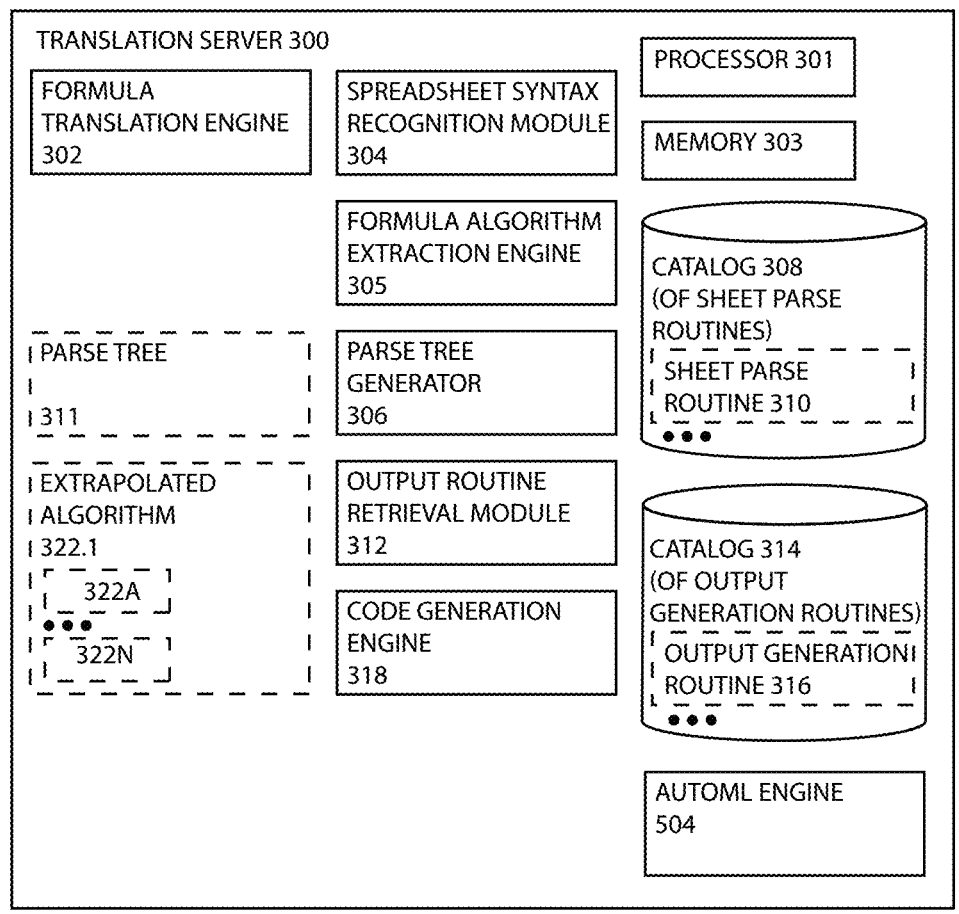
FIG. 3 illustrates the translation server of FIG. 1 that may receive and process the spreadsheet file of the client device of FIG. 2, including a formula translation engine, a formula algorithm extraction engine, a parse tree generator, a parse tree data, an output routine retrieval module, a code generation engine, and additional elements and components, according to one or more embodiments.

FIG. 3 illustrates the translation server 300 of FIG. 1 that may receive and process the spreadsheet file 204 of the client device 200 of FIG. 2, according to one or more embodiments. The translation server 300 is a computing device that includes a processor 301 and a memory 303. A formula translation engine 302 is a set of computer readable instructions that when executed on a processor (e.g., the processor 301) generates and stores an extrapolated algorithm 322 expressed in a programming language based on the formula algorithm 206. For example, the formula translation engine 302 may receive spreadsheet formulas (e.g., the formula algorithm 206 in a Microsoft® Excel format as may be extracted by the formula algorithm extraction engine 305) and convert the spreadsheet formulas to Java code. In one or more embodiments, the formula translation engine 302 may comprise, for example, Apache POI. In one or more embodiments, a spreadsheet formula 205 is equivalent to one or more functions of the programming language and each of the one or more independent variables referenced by the spreadsheet formula 205 defines a declared variable of the one or more functions of the programming language. For example, the "SUM (A1, B1)" formula where A1 and B1 are cell references may be equivalent to 'var1+var2' where var1 and var2 are declared variables to be assigned the values of the cells A1 and B1. In one or more embodiments, the pre-processing may determine cell references that cross data entries and may define additional cells to include all data required for calculation of the prediction metric into the data entry 216 to promote calculation-independence. For example, where all independent variables of a data entry 216 should be included in a single row but reference is made to other rows, new columns may be defined and the data from other rows transposed into cells created by the new columns. Further discussion is provided in conjunction with the embodiment of FIG. 12.

A spreadsheet syntax recognition module 304 is software code that when executed on the processor 301 recognizes a file format of the spreadsheet file 204 and/or a syntax of the formula algorithm 206. The spreadsheet syntax recognition module 304 may analyze MIME-type, reference file extension, analyze data patterns, and/or utilize another method known in the art to determine file type. The spreadsheet syntax recognition module 304 may read the spreadsheet file 204 to determine a recognized syntax of the formula algorithm 206, for example columnar format or a known file template.

A formula algorithm extraction engine 305 is software code that when executed on the processor 301 extracts the formula algorithm 206 from the spreadsheet file 204. For example, the formula extraction engine 305 may move cell-by-cell to determine whether a formula and/or a data referenced by a formula is present. In one or more embodiments, the formula algorithm extraction engine 305 performs several operations. A first operation of the formula algorithm extraction engine 305 may iterate through the formula algorithm 206 cell by cell from left to right, top to bottom. A number of matrices may be assembled, for example a matrix for a formula of each cell (e.g., a formula matrix), a matrix for a data value of each cell (e.g., a data value matrix), and a matrix for a data type of each cell (e.g., a data type matrix). If there is a formula in a cell of the formula matrix it may be evaluated using the data value and the data type found in a corresponding cell of the data value matrix and the data type matrix, respectively. Otherwise, if there is no formula, the data value and data type may be copied to a resulting table that stores a composed instance of the formula algorithm 206 outside of the spreadsheet file 204 (e.g., in Apache® Spark the resulting table may be referred to as a 'dataframe').

In one or more embodiments, the formula algorithm 206 may be converted to the extrapolated algorithm 322 by utilizing a parse tree. A parse tree generator 306 is software code that when executed on the processor 301 builds a parse tree data 311 from the extracted instance of the formula algorithm 206. The parse tree generator 306 may reference the catalog 308 of sheet parse routines to retrieve and utilize a sheet parse routine 310 corresponding to the file type and/or syntax of the spreadsheet file 204. For example, Apple Numbers® and Microsoft® Excel may have distinct instances of the parse routine 310 stored within the catalog 308. The sheet parse routine 310 is utilized by the parse tree generator 306 to build the parse tree data 311. The sheet parse tree routines 310 may be based on known parse tree generation for spreadsheet programs, for example, as described in "A Grammar for Spreadsheet Formulas Evaluated on Two Large Datasets" by Efthimia Aivalogou, David Hoepelman, & Felienne Hermans, Delft University of Technology, Netherlands (Proceedings of SCAM 2015).

The output routine retrieval module 312 is software code that when executed on the processor 301 determines a target output language and may retrieve from a catalog 314 an associated output generation routine 316 for the determined target output language. The target output generation routine 316 includes specific instructions for parse tree deconstruction and code generation to translate the parse tree data 311 into the extrapolated algorithm 322 in the target language (e.g., a programming language). For example, the output generation routine 316 may include a routine, specifically for SQL, for deconstructing the parse tree data 311 and translating the parse tree data 311 into the extrapolated algorithm 322. The target language may be known to and/or specified by the user 100, and/or may be inherent in the dataset 214 selected by the user 100. For example, where the dataset 214 comprises a database set up to be accessible and analyzed through Python, the output generation routine 316 for Python may be retrieved. Output generation routines 316 for other programming languages may include, for example, Scala, Java, Python, R, Clojure, Lisp, Haskel, and/or any Domain-specific programming language which can be generated with a Language Workbench like Spoofax (see https://www.metaborg.org/en/latest/) or WebDSL (see http://webdsl.org).

A code generation engine 318 is software code that when executed on the processor 301 utilizes the output generation routine 316 to deconstruct the parse tree data 311 according to parameters and requirements of the target language to generate the extrapolated algorithm 322. As shown in the embodiment of FIG. 3, the extrapolated algorithm 322 may be comprised of one or more extrapolated algorithms 322A through 322N, for example corresponding to each spreadsheet formula 205A through 205N of FIG. 2 together forming the formula algorithm 206. In one or more embodiments, the formula algorithm 206 is thereby converted from a set of spreadsheet formulas accepting formula inputs to a programming function accepting programming arguments and variables. The extrapolated algorithm 322 may define a series of chained function calls where the output from one function is the input to another function. For example, in the embodiment of FIG. 15, the 'Output Spark App in Scala' that displays "val offset_12= . . . " calls a function "sumColumn1" with one of the parameters being "sum_10", which in turn is the result of the first function call and can be seen as "val sum_10= . . . ". This may be an example of a chained function call in which functions are organized hierarchically with one function calling another function as a parameter, in which a result of the call function would be used as a parameter value in the calling function. One example of the deconstruction of the parse tree data 311 is further shown and described in conjunction with the process flow of FIG. 8.

The extrapolated algorithm 322 is shown in a first instance, the extrapolated algorithm 322.1. The extrapolated algorithm 322.1 may be immediately applied to and/or run against the dataset 214 (e.g., by the execution engine 404). However, in one or more embodiments, the extrapolated algorithm 322.1 may be further refined. In one or more embodiments, the AutoML engine 504 may analyze the extrapolated algorithm 322.1 and may thereafter modify the extrapolated algorithm 322.1, may propose an extension or adjustment, or may propose a similar or different algorithm that may better suit the user 100's needs. The AutoML Engine 504 is software code that when executed on the processor 301 may select appropriate features of a data analysis model, select an appropriate model family, optimize model parameters, engage in hyper parameter tuning, and/or postprocess machine learning models. The AutoML engine 504 may be or may utilize, for example, Google® Deep Mind. The AutoML engine 504 is further shown and described in conjunction with FIG. 5. In addition, although not shown in the embodiment of FIG. 3, the translation server 300 may execute and/or call the formula reduction engine 508, as shown and described in conjunction with FIG. 5 and FIG. 11.

Figure 4:
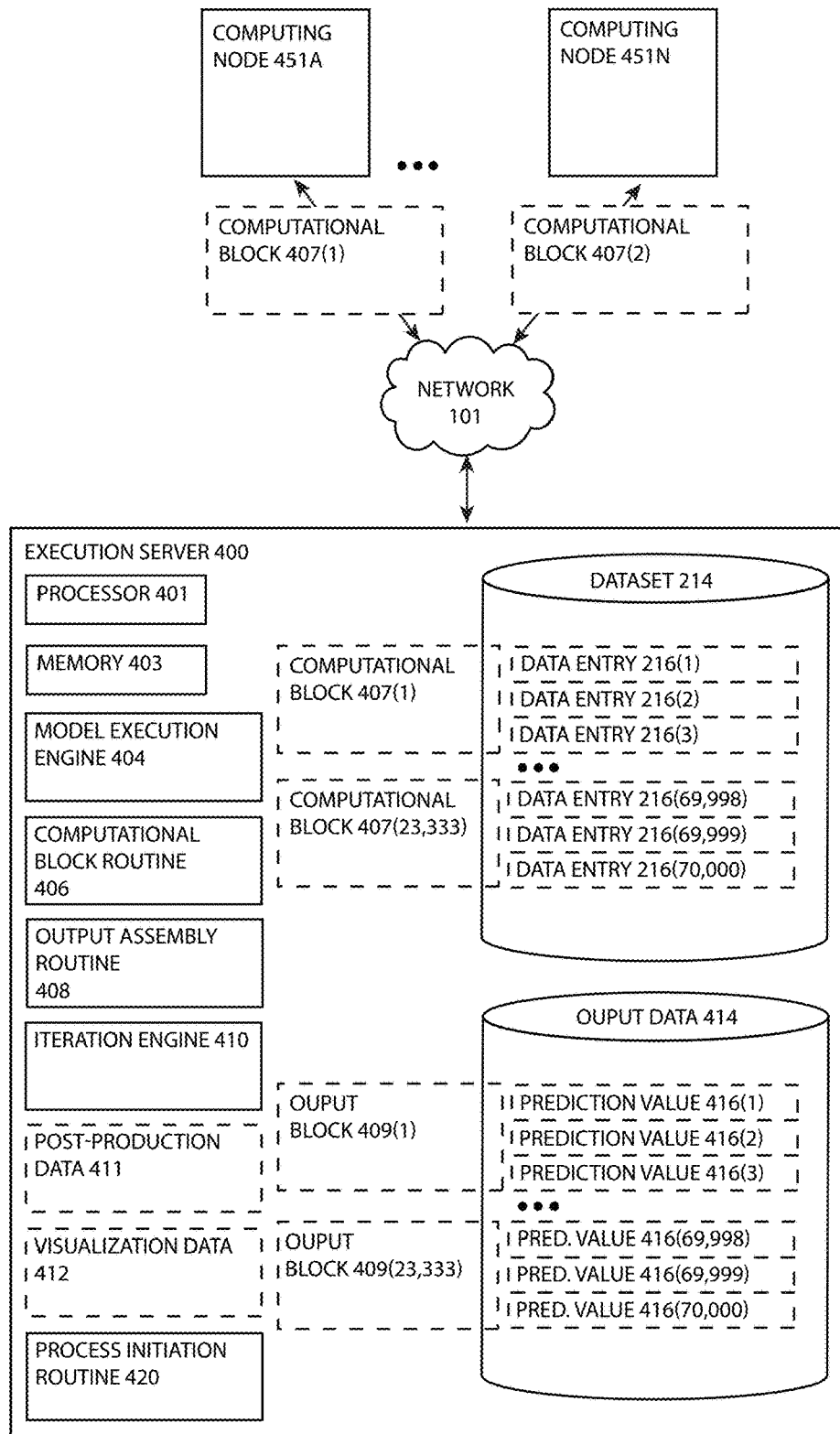
FIG. 4 illustrates the execution server of FIG. 1 that may receive the extrapolated algorithm generated by the translation server of FIG. 3 and/or the modified instance of the extrapolated algorithm generated by the model server of FIG. 1, the execution server including a dataset segmented into two or more computation blocks, a model execution engine to apply the extrapolated algorithm to the dataset, an output data segmented into two or more output blocks that may include a set of prediction values, and additional refinements of the output data such as a visualization data, according to one or more embodiments.

FIG. 4 illustrates the execution server 400 of FIG. 1 that may receive the extrapolated algorithm 322.1 generated by the translation server 300 of FIG. 3 and/or the modified instance of the extrapolated algorithm 322.2 generated by the model server 500 of FIG. 1, according to one or more embodiments. The execution server 400 comprises one or more server computers that include one or more processors 401 and memories 403. For example, the execution server 400 may be a cluster of servers running Hadoop and Apache® Spark, or similarly a cluster of MongoDB servers.

The model execution engine 404 is software code that when executed on the one or more processors 401 applies the extrapolated algorithm 322 to the dataset 214. The model execution engine 404 can comprise a database engine (e.g. Oracle, MySQL, Postgres), a distributed computing framework engine (e.g. Spark, Hadoop), or any engine capable of executing compiled or interpreted code in a programming language or instruction set. To perform execution the model execution engine 404 extracts function calls (e.g. Scala function calls in the case of Spark) and executes the function calls, and may in one or more embodiments make use of an imported software code library that is provided externally (e.g., over the network 101).

The model execution engine 404 receives the output data 414 from the dataset 214. In a specific example, the dataset 214 may be in a columnar format with four defined columns for data describing a record, each row representing a separate instance of the record (e.g., a data entry 216). The dataset 214 could be large, such as including over one million instances of the data entry 206 (e.g., rows of a data in a columnar format). In the embodiment of FIG. 4, each data entry 216 of the dataset is denoted with a trailing parenthetical number, from the first data entry 216(1) to the seven hundred thousandth data entry 216(700,000).

When the user 100 retrieves a prototype data 210 of the dataset 214 (e.g., 50 rows) and imports it to the spreadsheet application 202, the spreadsheet application 202 may display the prototype data 214 as 50 rows (e.g. rows 1 through 50) and four columns (e.g., columns A through D). The user 100 may then designate a fifth column (e.g., a column E) within the spreadsheet file 204 including a formula referencing columns A through D to define a simple instance of the formula algorithm 206 that may be a prediction metric 208 of each record in the prototype data 214. In the example of FIG. 2, an instance of the prototype data 210 is illustrated with two imported data entries 216, the data entry 216(1) and the data entry 216(2).

When the formula algorithm 206 is translated to the extrapolated algorithm 322 and applied to the dataset 214, the output data 414 may be the value of what would be a fifth column of the dataset 214, applied to each row of the dataset 214 (e.g., all seven hundred thousand rows). In other words, the application of the extrapolated algorithm 322 to the dataset 214 may generate the prediction values 416 for each row entry of the dataset 214. As illustrated in FIG. 4, this is the output data 414. A similar example is provided in FIG. 12, FIG. 13, FIG. 14 and FIG. 15.

The dataset 214 and the extrapolated algorithm 322 may be in a common syntax format such that a value of each prediction metric 208 (e.g., the predication data 416) of each of the two or more data entries 216 of the dataset 214 can be independently calculated. To calculate the output data 414 comprising each predication data 216, a computation block routine 406 comprises computer readable instructions that when executed on a processor (e.g., the processor 401) specifies a set of computation blocks 407 comprising data entries 216 of the dataset 214 to be submitted for computation, for example in parallel, and extracts and submits the set of computation blocks 407. Each computing block 407 comprises one or more data entries 216 of the dataset 214.

For example, in the embodiment of FIG. 4, one instance of the computation block 407 is specified as three data entries 216. In other cases, hundreds or thousands (or even more) data entries 216 may be specified as a single instance of the computation block 407. Each of the computation blocks 407 may be distributed among one or more nodes 451A through 451N of a computing cluster 450 for parallel processing. Each of the computing blocks 407 may be load-balanced on the computing cluster 450 for efficient processing. In one or more embodiments, the execution server 400 is a master node and/or a leader node of the computing cluster 450. In one or more embodiments, a scheduler of Spark may be utilized wherein a "round robin" of computation blocks can compute results, where a size of computation blocks (in data or data entries 216) can be specified.

The computing cluster 450 may produce an output block 409 for each computation block 407 and transmit each output block 409 to the execution server 400. The output assembly routine 408 comprises computer readable instructions that when executed on a processor (e.g., the processor 401) assembles the output data 414 from each of the set of output blocks 409. For example, in the embodiment of FIG. 4 the output data 414 may comprise one instance of the prediction value 416 for each data entry 216 of the dataset 214. The output data 414 may be re-combined from data that includes one or more output blocks 409. The output data 414 may be stored in a database or as a file. The computation block routine 406 and the output assembly routine 408 may act together to implement what may be known in the art as a 'MapReduce' operation.

Following output of the output data 414, additional processing may result in post-production data 411. For example, a linear regression or other analysis operation may be applied to the output, which may be either selected by the user 100 or automatically applied. Alternatively or in addition, the output data 414 may be processed to become the visualization data 412. For example, the output data 414 may be transmitted to and visualized through a data analysis platform such as Tableau®, or communicated back to visualization tools of the spreadsheet application 202. An example of the visualization is shown and described in conjunction with the embodiment of FIG. 17.

Figure 17:
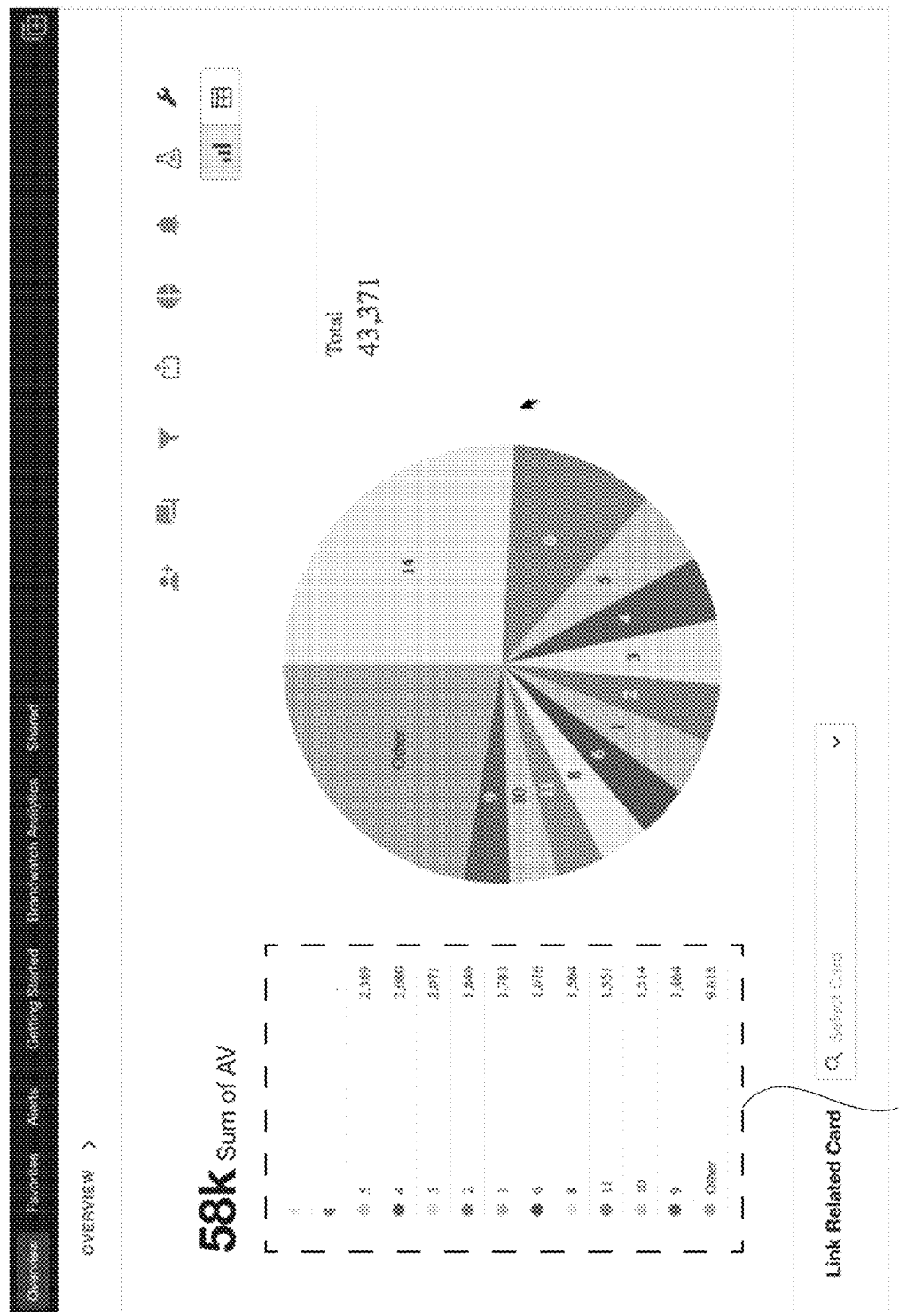
FIG. 17 is an example of the output data including the prediction values resulting from the extrapolated algorithm of FIG. 15, the output data permitting the user having spreadsheet skill to view, work with, and/or comprehend the large dataset of the Spark Cluster, including deriving insight empowering the user to refine and/or analyze the formula algorithm to improve a data analysis model and/or prediction metric, according to one or more embodiments.

While a single instance and/or snapshot of the output data 414 may be generated, the output data 414 may also be continuously generated to create updating or even real-time data analysis for an evolving instance of the dataset 214. The iteration engine 410 may store and periodically apply the extrapolated algorithm 322 to the dataset 214 (e.g., once per day, once per hour, once per 400 milliseconds). When the output data 414 is visualized, for example with a pie chart as shown in FIG. 17, this may result in a dynamic adjustment of percentages represented in the pie chart. For example, in an online advertising network, percentages of the advertising network comprised of advertisement publishers that are "high performance" or "low performance" (e.g., as measured by the prediction metric 208) may change dynamically as ad campaigns are run and ad request records are recorded as new data to the dataset 214.

The user 100 may, through analysis and visualization of the output data 414, refine their data analysis model and/or prediction metrics 208 embodied in the formula algorithm 206. The user 100 may determine tuning or parameter adjustment is advantageous or necessary for increased data analysis model accuracy and/or prediction accuracy. The iteration engine 410 may receive and execute updates to the extrapolated algorithm 322 (e.g., an extrapolated algorithm 322.3). This may permit the user 100, utilizing the spreadsheet application 202, to continue to tune and evolve their data analysis model and/or prediction metric 208 with, according to one or more embodiments, continuous feedback that may inform adjustments and revisions.

Although shown as distinct servers in the network of FIG. 1, the translation server 300, the model server 500, and/or aspects of the execution server 400 may also be implemented within a data container (e.g., implemented with a Docker® container) and/or virtual machine (e.g., a virtual computer running on another computer, or "VM") upon request of the user 100. For example, the user 100 may cause the container and/or the virtual machine to spawn upon entering a request from the plugin of the spreadsheet application 202. In another example, the container may be spawned and/or the virtual machine stood up upon first generation of the extrapolated algorithm 322 by the translation server 300. The container may include one or more functions of the translation server 300 such as the parse tree generator 306 and the code execution engine 318, in addition to the model execution engine 404, an interface for modifying the extrapolated algorithm 322, the iteration engine 410, and/or a visualization application to produce the visualization data 412. The container may therefore be charged with managing the entire life cycle of a data science app development, from prototype development to production and also supporting feedback loops of data analysis model revision. The container may also provide a web interface to the user 100 so that the user 100 can upload their spreadsheets files 204 and configure how the app will behave (e.g. number of nodes, size of nodes, behavioral properties, other possible parameters) (e.g., as shown in FIG. 16). The container may communicate with third-party API's such as Tableau® or Domo®.

Referring again to FIG. 4, the process initiation routine 420 may provision a computing virtual machine, provision a computing process container, and/or initiate a microservice. The initiation routine 420 may occur upon submission of a computation block 407 and/or at generation of the output data 414. The virtual machine, the computing process container, and/or the microservice may store the output data 414 in a computer memory, and in one or more embodiments may act as an API respond to, and/or initiate requests related to, the output data 414, for example to retrieve aspects of the output data 414, to effect further analysis, and/or to interact or be called by additional software applications.

Figure 5:
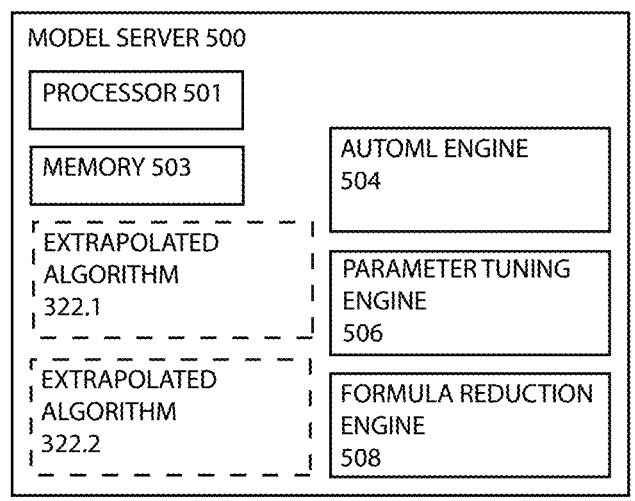
FIG. 5 illustrates the model server of FIG. 1, including an automatic machine learning engine, a parameter tuning engine, a formula reduction engine, a first instance of the extrapolated algorithm before modification (e.g., as produced by the translation server of FIG. 3) and a second instance of the extrapolated algorithm as modified by the model server, according to one or more embodiments.

FIG. 5 illustrates the model server 500 of FIG. 1, including an automatic machine learning engine (the AutoML engine 504), a parameter tuning engine 506, a formula reduction engine 508, a first instance of the extrapolated algorithm 322.1 before modification (e.g., as produced by the translation server of FIG. 3) and a second instance of the extrapolated algorithm 322.2 as modified by the model server 500, according to one or more embodiments. The model server 500 is a server that may optionally be utilized for the user 100 to modify and/or adapt the extrapolated algorithm 322.1, according to one or more embodiments. For example, the model server 500 may be a data science notebook running on a web platform that receives and displays the extrapolated algorithm 322. An instance of the user 100 with sufficient skill may review the extrapolated algorithm 322.1 and may tune or edit the target language in which it is coded (e.g., in the programming language). Alternatively or in addition, the AutoML Engine 504 may run on the model server 500 to aid in analysis of the extrapolated algorithm 322, or its modification or replacement. After either modification, extension, or replacement, the extrapolated algorithm 322 may be referred to as the extrapolated algorithm 322.2, which may be ready for application to the dataset 214.

The parameter tuning engine 506 comprises computer readable instructions that when executed on a processor (e.g., the processor 501) automatically adjust parameters of the formula algorithm 206 and/or the extrapolated algorithm 322. The operations of the parameter tuning engine 506 are shown and described in conjunction with FIG. 11. The formula reduction engine 508 comprises computer readable instructions that when executed on a processor (e.g., the processor 501) automatically determine an equivalency of an instance of the spreadsheet formula 205 to a function of the programming language, a redundancy in the formula algorithm 206, and/or an approximation opportunity for increasing a computational efficiency. The operations of the formula reduction engine 508 are shown and described in conjunction with FIG. 11.

Figure 6:
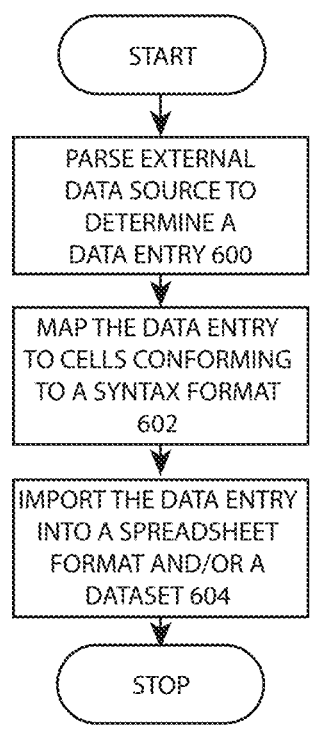
FIG. 6 is a data pre-processing process flow illustrating a process by which data can be automatically loaded into a spreadsheet file in a syntax format, for example to populate the prototype data of FIG. 2 for model building purposes, and/or to review all or a portion of the dataset in the spreadsheet application, according to one or more embodiments.

FIG. 6 is a data pre-processing process flow illustrating a process by which data can be automatically loaded into a spreadsheet file 204 in a syntax format, for example to populate the prototype data 210 of FIG. 2 for model building purposes (of the user 100), and/or to review all or a portion of the dataset 214 in the spreadsheet application 202, according to one or more embodiments. One or more of the operations of FIG. 6 may be executed by computer readable code of the pre-processing module 207 of FIG. 6, according to one or more embodiments.

Operation 600 parses an external data source to result in one or more instances of the data entry 216. The external data source may be a spreadsheet file, a word processing document, a .csv file, or another source of data. For example, operation 600 can call a previous output data 414 for addition to one or more data entries 216 of the dataset 214. The data of the external data source does not have to be arranged and/or specified in the syntax format. For example, the external data source may be a large publicly available database of medical data accessible through an API and the parsing routine may determine a set of independent instance of the data entries 216 that each correspond to a single anonymized patient. Operation 602 maps the instance of the data entry 216 to one or more cells conforming to the syntax format. The map comprises computer readable instructions or data that relate each of piece of data of each data entry 216 to a cell of the spreadsheet file 204. For example, each patient's data may be a distinct data entry 216, each on a separate row of the spreadsheet file 204. Within each data entry 216, a patient zip code may be defined such that it will be placed in Column B, a number of annual emergency room visits in column C, and a number of urgent care visits in column D. Operation 604 then imports the one or more instances of the data entry 216 into the spreadsheet file 204 and/or the dataset 414. The map of operation 216 conforms to the syntax format on which extrapolated algorithm 322 may operate. In one or more embodiments, operation 604 may identify within a subject data entry 216 a reference to a second data entry 216 (e.g., a reference from one row to another) and replicate data of the second data entry 216, which may be one method of ensuring calculation independence when the subject data entry 216 is computed with the extrapolated algorithm 322.

As an example of the operation of FIG. 6, the user 100 may query the public health data and extract a sample data, which could be a random sample and/or a specific sample with known significance. The user 100 may utilize this sample data to define the formula algorithm 206 that receives as inputs (e.g., independent variables) the data from each data entry 216 of the sample data, and outputs a prediction metric 208 for each data entry 218. In other words, the user 100 defines a model for the sample data and, by extension, the complete dataset. For example, the user 100 may define a formula algorithm 206 that attempts to determine how likely a patient is to have undiagnosed diabetes based on annual health care facility visits. After experimenting and tuning the model, it may be ready to be applied again the complete dataset (e.g., the dataset 214).

Figure 7:
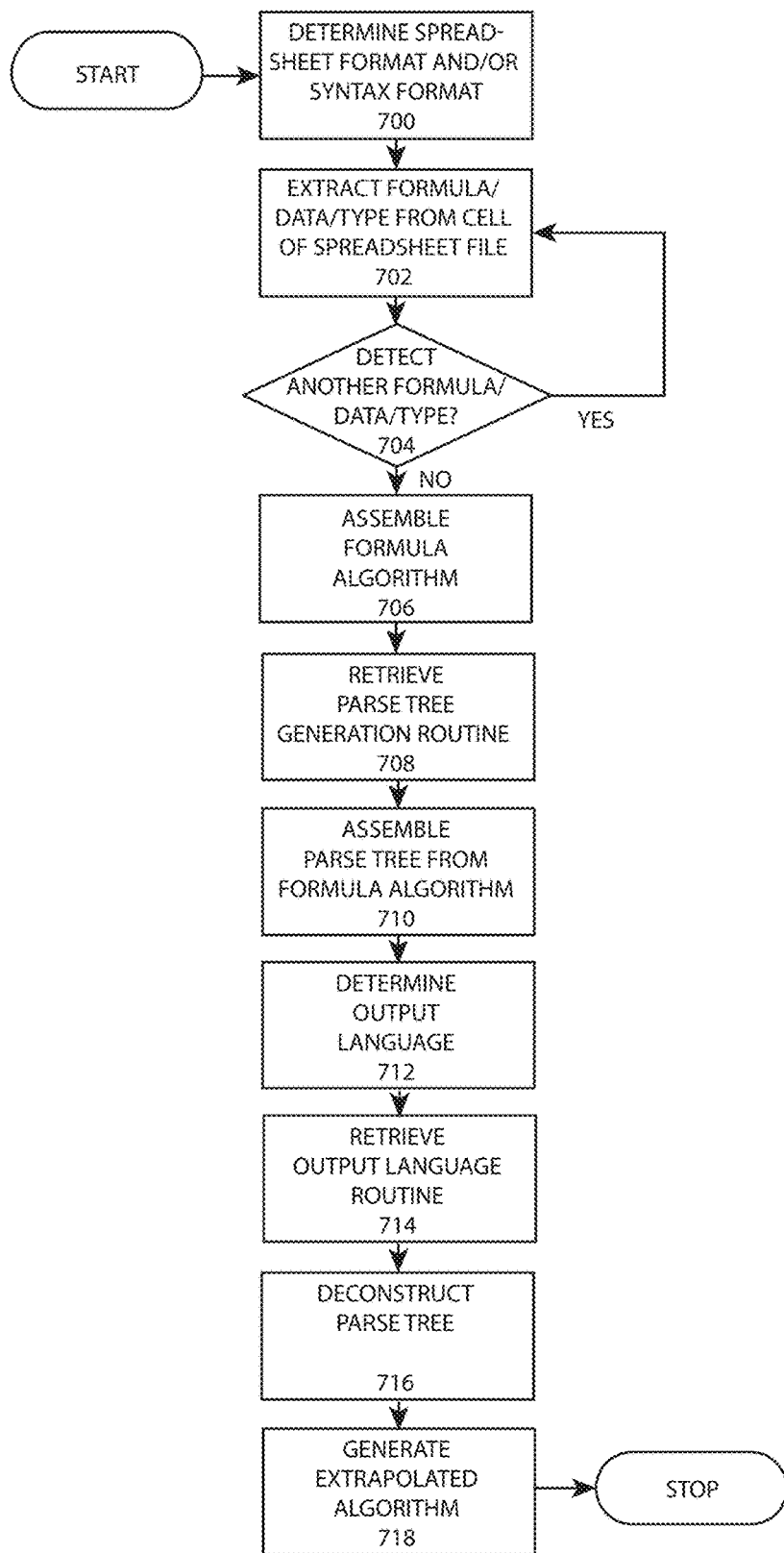
FIG. 7 is a formula algorithm translation flow illustrating a process by which the spreadsheet file may be converted to the extrapolated algorithm, e.g., by the translation server of FIG. 3, according to one or more embodiments.

FIG. 7 is a formula algorithm translation flow illustrating a process by which the formula algorithm 206 of the spreadsheet file 204 may be converted to the extrapolated algorithm 322 (e.g., by the translation server 300 of FIG. 3), according to one or more embodiments. Operation 700 determines a spreadsheet format and/or a syntax format. For example, operation 700 may determine that a spreadsheet file 204 is in an Excel format, and/or that the formula algorithm 206 is specified in a syntax format that is a columnar data format or in a syntax format specified in a spreadsheet file 204 that is a template for data analysis. Operation 702 extracts a formula, data value, and/or data type from a cell of the spreadsheet, for example through a process of building the formula matrix, the data value matrix, and/or the data type matrix described in conjunction with FIG. 3. Operation 702 may extract from the spreadsheet file 202 and store in computer memory (e.g., the memory 303) the one or more spreadsheet formulas 205 comprising the formula algorithm 206, the one or more independent variables (e.g., independent variables 1204) referenced by the one or more spreadsheet formulas 205, and also extract the prediction metric 208. Operation 704 moves to a next cell and determines whether an additional formula, data value, and/or data type is stored within the cell. If detected, operation 704 returns to operation 702. If not, operation 704 proceeds to operation 706 which assembles the formula algorithm 206 (e.g., by cross-referencing the matrices as described in conjunction with FIG. 3). Operation 706 may assemble each of the one or more spreadsheet formulas 205 into the formula algorithm 206 and store the formula algorithm 206 in a computer memory (e.g., the memory 303). An example of an assembled formula algorithm 206 is shown in FIG. 13. In one or more embodiments, operation 706 may also proceed to operation 900 of FIG. 9.

Operation 708 retrieves a parse tree generation routine (e.g., the sheet parse routine 310 of the catalog 308) that may determine how to assemble a parse tree data 311 from the extracted formula algorithm 206. For example, the parse tree routine 310 may be a routine to analyze the functions of Excel and build a syntactical representation of the formulas of the specific spreadsheet application 202. Operation 708 assembles the parse tree data 311 from the formula algorithm 206. In one or more embodiments, operation 708 is not necessary as the operation 710 may support a single file type, or certain file types may have substantially similar requirements.

Operation 712 determines the output language (e.g., the programming language) of the formula algorithm 206. For example, the user 100 may specify the output language or the output language may be automatically detected based on the database designation data 212, the intended dataset 214, and/or one or more environments in which the dataset 214 runs. The programming language may be, for example, Scala, Java, Python, R, Clojure, Lisp, Haskel, or any Domain-specific programming language which can be generated with a Language Workbench like Spoofax and/or WebDSL. Operation 714 retrieves the output language routine (e.g., output generation routine 316 of the catalog 314). Operation 712 and operation 714 may be optional as there may be a single output language that may be coded as part of operation 716 and operation 718.

Operation 716 deconstructs the parse tree data 311 by walking one or more nodes of the parse tree data 311 and determining relevance as specified in the output generation routine 316. Similarly, operation 718 generates the extrapolated algorithm 322, and in the embodiment of FIG. 7 by mapping each relevant node of the parse tree data 311 to a function of the output programming language. In one or more embodiments, operation 716 and operation 718 may, for example, be implemented with the embodiment of FIG. 8.

Figure 8:
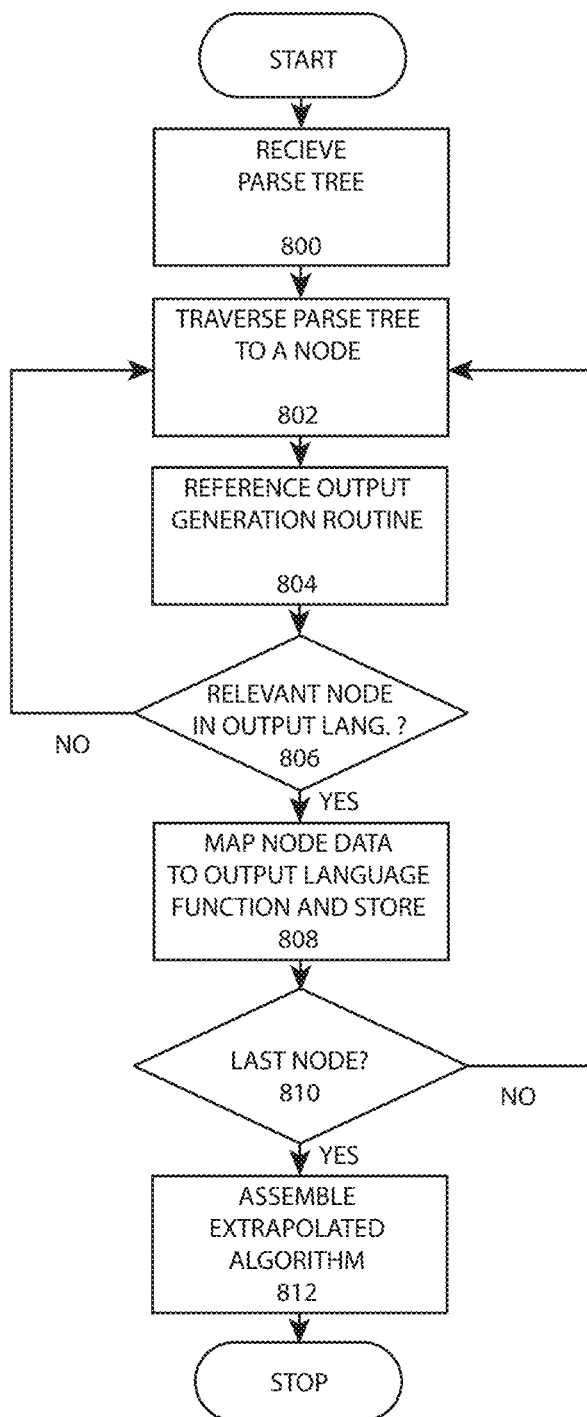
FIG. 8 is a parse tree deconstruction and code generation process flow illustrating a process by which the parse tree data of FIG. 3 may be deconstructed and the extrapolated algorithm constructed in a target output language with an output generation routine, according to one or more embodiments.

FIG. 8 is a parse tree deconstruction and code generation process flow illustrating a process by which the parse tree data 311 of FIG. 3 may be deconstructed and the extrapolated algorithm 322 constructed with an output generation routine 316 in a target output language, according to one or more embodiments. Operation 800 receives the parse tree (e.g., the parse tree data 311). Operation 802 traverses the parse tree of the parse tree data 311 to arrive at a node of the parse tree. Operation 802 may begin at a root of the parse tree. Operation 804 may then reference the output generation routine 316 to retrieve a routine to determine whether data of the node is relevant to the output language. Operation 806 determines whether the node contains data relevant to the output programming language by comparison to the output generation routine 316. For example, operation 804 may determine that a function SUM or a value with a specific data type is supported. If not, operation 806 returns to operation 802 to traverse the parse tree to a new node. If the node contains data relevant to the output programming language, operation 806 proceeds to operation 808.

Operation 808 maps the data of the relevant node to a function of the output programming language. For example, a SUM formula in Excel format may map to a "+" function in Scala. In another example, the Excel "if" statement of the form "(IF, , ,)" may be translated to a Scala 'if' statement of the form "if { } else if{ } else{ }". In other cases, there may not be a direct mapping between spreadsheet formula and a Scala function. However, equivalencies and/or contingencies can be defined (e.g., in the output generation routine 316), where the form of operation of the spreadsheet formula 205 and/or the formula algorithm 206 can be emulated through a series of functions in the output programming language such as Scala. Operation 810 determines whether the node selected in operation 802 is a last node of the parse tree data 311. If not, operation 810 returns to operation 802. If the last node is determined, operation 810 proceeds to operation 812 for assembly of the extrapolated algorithm from function data and/or additional data mapped from each formula and/or additional data of each relevant node of the parse tree data 311.

Figure 9:
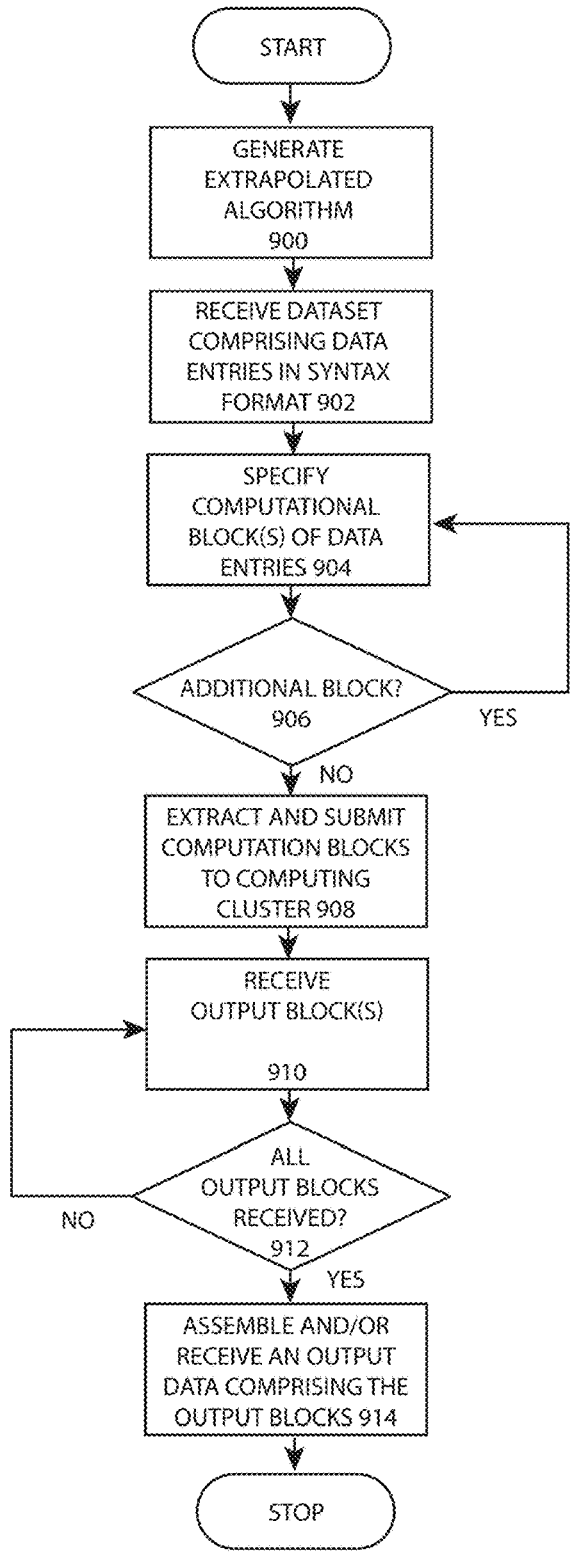
FIG. 9 is a dataset evaluation process flow illustrating a process flow for data analysis through an interface of a spreadsheet application, including applying the extrapolated algorithm against a dataset in the syntax format, with the dataset submitted to a computing cluster in computation blocks to be processed in parallel and recombined as an output data from output blocks, according to one or more embodiments.

FIG. 9 is a dataset evaluation process flow illustrating a process flow for data analysis through an interface of a spreadsheet application 202, including applying the extrapolated algorithm 322 against a dataset 214 in the syntax format, with the dataset 214 submitted to a computing cluster 450 in computation blocks 407(1) though 407(N) to be processed in parallel and recombined as an output data 414 from output blocks 409(1) though 409(N), according to one or more embodiments. Operation 900 generates the extrapolated algorithm 322, for example using Apache POI and/or operation 718. In one or more embodiments, the extrapolated algorithm 322 is defined to read data entries 216 in the syntax format which will match the dataset 214. Operation 902 receives a dataset 214 that includes two or more data entries 216 in the syntax format usable as an input to the extrapolated algorithm 322 to independently calculate the prediction metric 208 of each of the two or more data entries 216 of the syntax format of dataset 214. For example, the dataset 214 may be submitted by the user 100 independently from the submission of the extrapolated algorithm 322. Operation 902 can also call a previous output data 414 for addition to one or more data entries 216 of the dataset 214.

Operation 904 specifies a computation block 407 that includes one or more data entries 216 of the dataset 214. For instance, where a dataset 214 comprises one million independently calculatable data entries 216, the dataset 214 may be segmented into ten equal pieces (e.g., one hundred thousand data entries 216 each) and submitted for computation on the computing cluster 450. Operation 906 determines whether there are one or more additional computation blocks 407 to be specified within the dataset 214, in which case operation 906 returns to operation 904. If all data entries 216 of the dataset 214 are accounted for, operation 906 proceeds to operation 908. Operation 906 may occur after operation 908, for example, to permit sets of data entries 216 to be extracted and submitted before a determination of completion of the additional computation blocks 407.

Operation 908 extracts from the dataset 214 each of the one or more data entries 216 within each computation block 207 and submits each computation block 207 and the extrapolated algorithm 322 to a computing cluster (e.g., the computing cluster 450) over a network (e.g., the network 101). The computer cluster then independently calculates the prediction value 416 of the prediction metric 208 of each data entry 216 of the dataset 214. In one or more embodiments, the extrapolated algorithm 322 is applied against each instance of the computation block 207 resulting in the output block 207 comprising a prediction value of the prediction metric 208 of each instance of the data entry 216 within each computation block 207. For example, the computation block 207(1) may include data entry 216(1) through data entry 216(20). A prediction metric 208 has been defined by the extrapolated algorithm 322. In one or more embodiments, the computing cluster 450 may apply multiple stages of analysis, for example to first identify any cross-references in data entries 216 which may require additional memory, pre-calculation, and/or other steps to ensure calculation independency of each data entry 216 of the dataset 214 when the extrapolated algorithm 322 is applied. When the extrapolated algorithm 322 is applied against the computation block 207(1), the result is twenty prediction values 416 of the prediction metric 208 (e.g., one for each data entry 216 and assuming a single prediction metric 208 is defined).

Operation 910 receives the output blocks 209, for example from the computing cluster 450. Operation 912 determines whether all output blocks 209 have been received. If all have been received, operation 912 proceeds to operation 914, and if not, operation 912 returns to operation 910. Operation 912 receives an output data 414 re-combined from data that includes all output blocks 409, for example into a single .csv file that may include the input(s) (e.g., the independent variables) and the output(s) (the dependent variable that may be the prediction metric 208).

Figure 10:
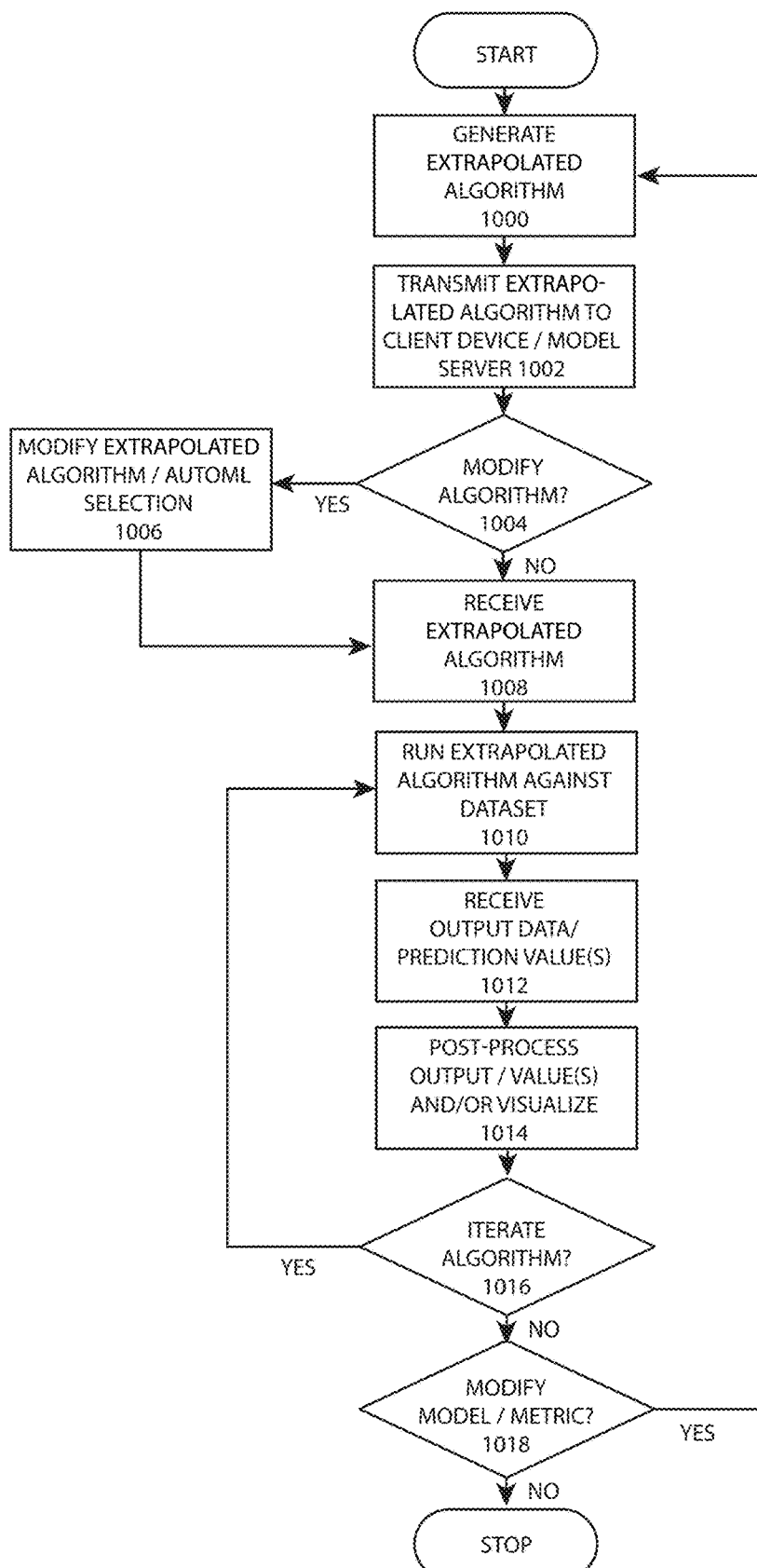
FIG. 10 is an algorithm evaluation process flow illustrating a process by which the output data of FIG. 1 is generated and the extrapolated algorithm may be refined by the user to improve the data analysis model embodied in the formula algorithm, according to one or more embodiments.

FIG. 10 is an algorithm evaluation process flow illustrating a process by which the output data 414 of FIG. 1 is generated and the extrapolated algorithm 322 may be refined, according to one or more embodiments. Operation 1000 generates the extrapolated algorithm 322, for example similar to operation 718, operation 900, and/or by one or more of the processes and components described in the present embodiments. Operation 1002 transmits the extrapolated algorithm 322 to the client device 200 and/or the model server 500. Operation 1004, which may occur for example on the client device 200 and/or the model server 500, may determine whether the extrapolated algorithm 322 is to be modified (from a first state, referred to as the extrapolated algorithm 322.1). For example, the user 100 may specify the user 100 would like to manually modify the code of the output programming language of the extrapolated algorithm 322 (e.g., adjust the SQL query). Similarly, an AutoML engine 504 may propose modifications and/or alternatives. Operation 1006 modifies the extrapolated algorithm 322.1 and/or selects modifications and/or alternatives proposed by the AutoML engine 504 to define the extrapolated algorithm 322.2.

Operation 1008 receives the extrapolated algorithm 322 (and/or, where modified or adjusted, the extrapolated algorithm 322.2), for example at the translation server 300 and/or the execution server 400. Operation 1010 runs the extrapolated algorithm 322 against the dataset 214, for example utilizing the model execution engine 404. Operation 1008 may utilize one or more of the processes of FIG. 9 to apply the extrapolated algorithm 322 against the dataset 214, including the computing cluster 450.

Operation 1012 receives the output data 414 that may include the prediction value 416 that may be data generated based on the prediction metrics 208. Operation 1014 may postprocess the output data 414 and/or the prediction values 416, for example by applying additional statistical or analytical models to the data. Alternatively or in addition, operation 1014 may visualize the output data 414 and/or the prediction values 416 by generating the visualization data 412.

Operation 1016 determines whether the extrapolated algorithm 322 is to be iterated on the dataset 214. For example, the dataset 214 may be changing or evolving in real time. The iteration engine 410 may effect operation 1016. If iteration is to occur, and according to any additional conditions that may be predetermined, operation 1016 returns to operation 1010. The user 100 may therefore continually view or analyze the output data 414, the prediction values 416, the post-production data 411, and/or the visualization data 412.

Operation 1018 determines whether the extrapolated algorithm 322, and the analytical model and/or the prediction metrics 208 it embodies, should be refined. For example, the user 100 may determine that the model defined in spreadsheet formulas 205 (e.g., that make up the formula algorithm 206 within the spreadsheet file 204) may require adjustment to better model, analyze, or make predictions from the dataset 214. It is also possible for AutoML processes to effect operation 1018. The user 100 may modify the formula algorithm 206 and re-submit the formula algorithm 206, may modify the code of the extrapolated algorithm 322 in its target programming language, and/or apply an AutoML process before re-submitting the extrapolated algorithm 322 to be run against the dataset 214. If the data analysis model is to be refined (as determined by the user 100 and/or an automatic process), operation 1018 returns to operation 1000 to re-generate the extrapolated algorithm 322 (e.g., a third instance that may be an extrapolated algorithm 322.3). The process may repeat, which may incrementally increase accuracy of a data analysis model, relevancy of a prediction metric 208, yield better set of prediction values 416, and/or result in increasing value of business intelligence drawn from the dataset 214.

Figure 11:
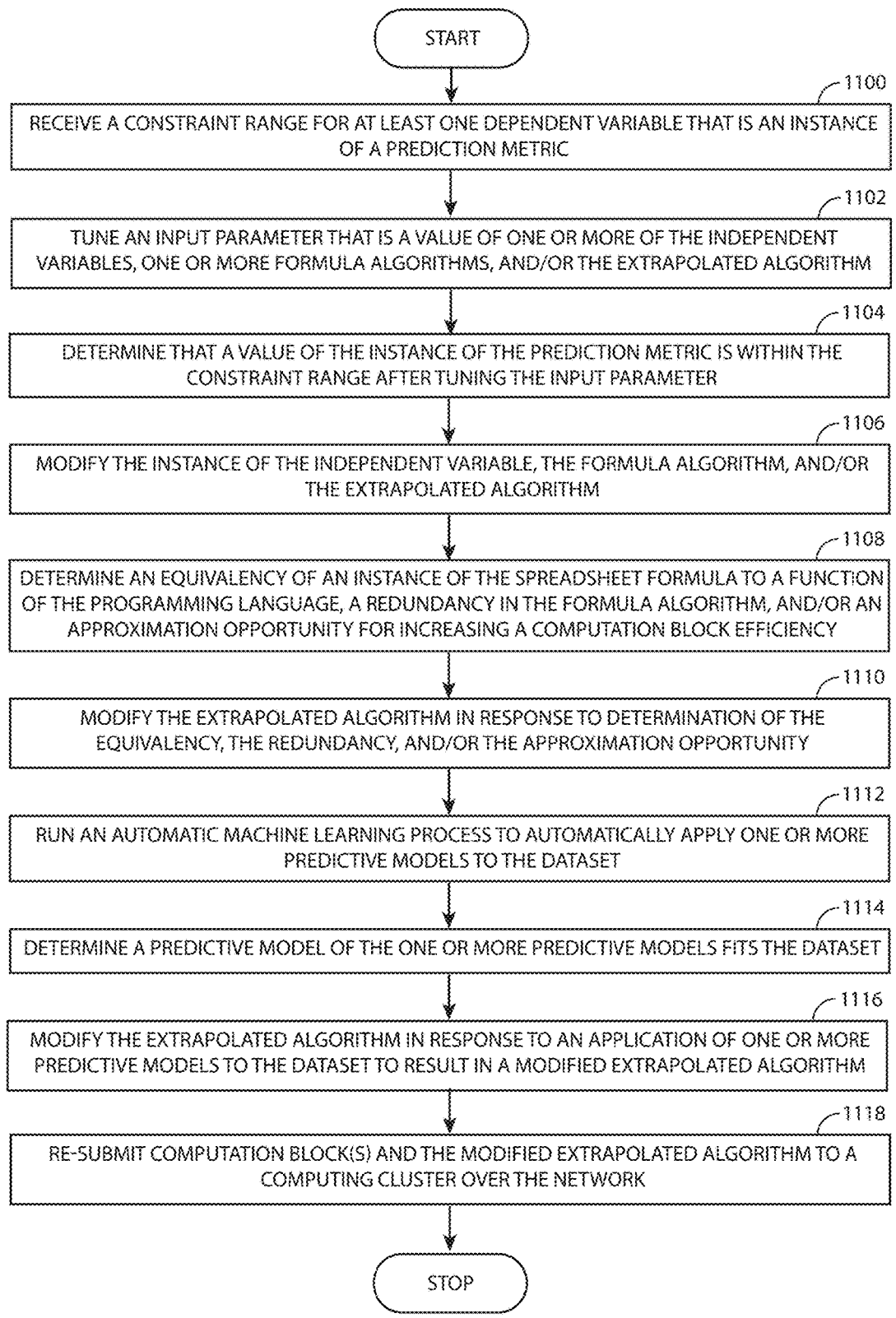
FIG. 11 is an algorithm modification process flow illustrating a process for adjusting the extrapolated algorithm through one or more processes including parameter tuning, determining equivalencies within the extrapolated algorithm, and/or through automatic application of predictive models using an AutoML process, according to one or more embodiments.

FIG. 11 illustrates a process for adjusting and/or modifying the extrapolated algorithm 322 through one or more processes including parameter tuning, determining equivalencies within the extrapolated algorithm, and/or through automatic application of predictive models of an AutoML process, according to one or more embodiments. In one or more embodiments, any or all of the processes of FIG. 11 may be utilized in operation 1004 and operation 1006 of FIG. 10. Operation 1100 receives a constraint range for at least one dependent variable that is an instance of the prediction metric 208. For example, where the prediction metric 208 may have a prediction value of a number from zero to one (which may for example specify a probability), the user 100 may input a constraint range of 0.95 to 1. The syntax format of the spreadsheet file 204 may include a cell designated for input of the constraint range, or which may otherwise be specified for recognition. Alternatively, the user 100 may separately submit the constraint range through other means.

Operation 1102 tunes an input parameter that is a value of one or more of the independent variables, the formula algorithm 206, and/or the extrapolated algorithm 322. For example, the input parameter may be a number stored in a cell of the spreadsheet file 202 and referenced by one or more of the spreadsheet formulas 205 comprising the spreadsheet formula 206, such as an arbitrary weight score the user 100 defined to be applied to other data of a data entry 216. In another example, the formula algorithm 206 (and/or each of its constituent spreadsheet formulas 205) may be adjusted. For example, a "round down" function may be discarded such that decimals are permitted and/or additional decimal places as originally defined may be permitted to increase accuracy. In yet another example, the formula algorithm 206 may be adjusted such that one operation (e.g., linear progression) is replaced with another (e.g., exponential regression), and/or a polynomial fit is replaced with a polynomial of one order (e.g., third order) with a polynomial of another order (e.g., fifth order). Similar aspects of the extrapolated algorithm 322 may similarly be modified to adjust the model defined by the user 100. Operation 1104 determines that a value of the instance of the prediction metric 208 is within the constraint range after tuning the input parameter. In the above example, after adjusting an independent variable, the value of the instance of the prediction metric 208 may fall within the range 0.95 to 1. Operation 1106 then modifies the instance of the independent variable, the formula algorithm, and/or the extrapolated algorithm. The modification is to effect one or more of the parameter test changes determined to be place the value of the prediction metric within the constraint range. The user 100, for example, may designate which independent variables and/or spreadsheet formulas 205 to parameterize by bolding them within a cell, which may act as a signal to the model server 500. Operation 1100 through operation 1106 may be especially useful when the user 100 is working with the prototype data 210. For example, the user 100 may work with fifty data entries 216 of health data, one for each patient, that the user 100 knows to be identified cases of diabetes. The user may be assigning weight scores to one or more pieces of medical data in the data entries 216, with both the medical data and the weight scores stores in cells of the spreadsheet file 204 as independent variables. For the known outcomes, the user 100 may define the constraint range of the dependent variable (e.g., the prediction metric 208 defining a probability for diabetes) to be 0.97. One or more of the independent variables, particularly the weight score, may then be designated by the user 100 and/or automatically parameterized such that as many as possible of the data entries 216 in the prototype data 210 fall within the constraint range.

Operation 1108 and operation 1110 demonstrates another process by which the formula algorithm 206 and/or the extrapolated algorithm 322 may be modified. Operation 1108 determines an equivalency of an instance of the spreadsheet formula 205 to a function of the programming language, determines a redundancy in the formula algorithm 206, and/or determines an approximation opportunity for increasing a computational efficiency. For example, the equivalency of the instance of the spreadsheet formula 205 to the function of the programming language may occur where a complex instance of the spreadsheet formula 205 (which may have several nested clauses) can be reduced to one or a few functions of the programming language. Similarly, the redundancy in the formula algorithm 206 may arise because the user 100 has applied repeated operations or transformations on data and the formula can be reduced to a simplified mathematical expression. For example, an independent variable stored in cell A1 may be referenced by a formula algorithm 205 in cell B1 that multiplies the independent variable by '2'. The cell B1 may be referenced by a formula algorithm 205 in cell B2 that multiples the value of B1 by '1.5'. Although this process may help the user 100 to model their particular problem and/or production metric 208, it may be combined to a single operation of multiplying by 3. The approximation opportunity is an opportunity to reduce part or all of the formula algorithm 206 and/or the extrapolated algorithm 322 to a simplified, approximate expression. For example, for computational efficiency the value pi may be approximated to five decimal points, or values taken from certain exponential or other functions may be approximated. The computation efficiency may similarly increased by rounding numbers, removing decimals, and replacing indexing or sorting algorithms with algorithms of better efficiency.

Operation 1112 runs an automatic machine learning process (AutoML) to automatically apply one or more predictive models to the dataset 214. For example, the AutoML process may automatically run a linear regression, exponential regression, geometric regression, and/or apply additional curve fits, to any data provided within the dataset 214. Other predictive models may be applied to determine significant data to act as independent variables, especially where certain outcomes or results are known. Operation 1114 determines a predictive model of the one or more predictive models applied to the dataset 214 fits the dataset 214. A fit may be determined where the applied predictive model falls within accepted parameters for a fit within the generally used and predefined bounds for that predictive model (e.g., a correlation within 0.95), or as may be defined by the user 100. Operation 1116 modifies the extrapolated algorithm 322 in response to an application of one or more predictive models to the dataset 214 to result in a modified extrapolated algorithm 322 (e.g., a modification from the extrapolated algorithm 322.1 to the extrapolated algorithm 322.2). For example, operation 1116 may replace a linear regression with an exponential regression. Operation 1118 re-submits the computation block 407 and the modified extrapolated algorithm 322 to the computing cluster 450 over the network 101. In the case where the output data 414 has not yet been computed, then operation 1116 may rather submit the computation blocks 407 for the first time. The three distinct processes of FIG. 11 may be used independently or in conjunction with one another.

Figure 12:
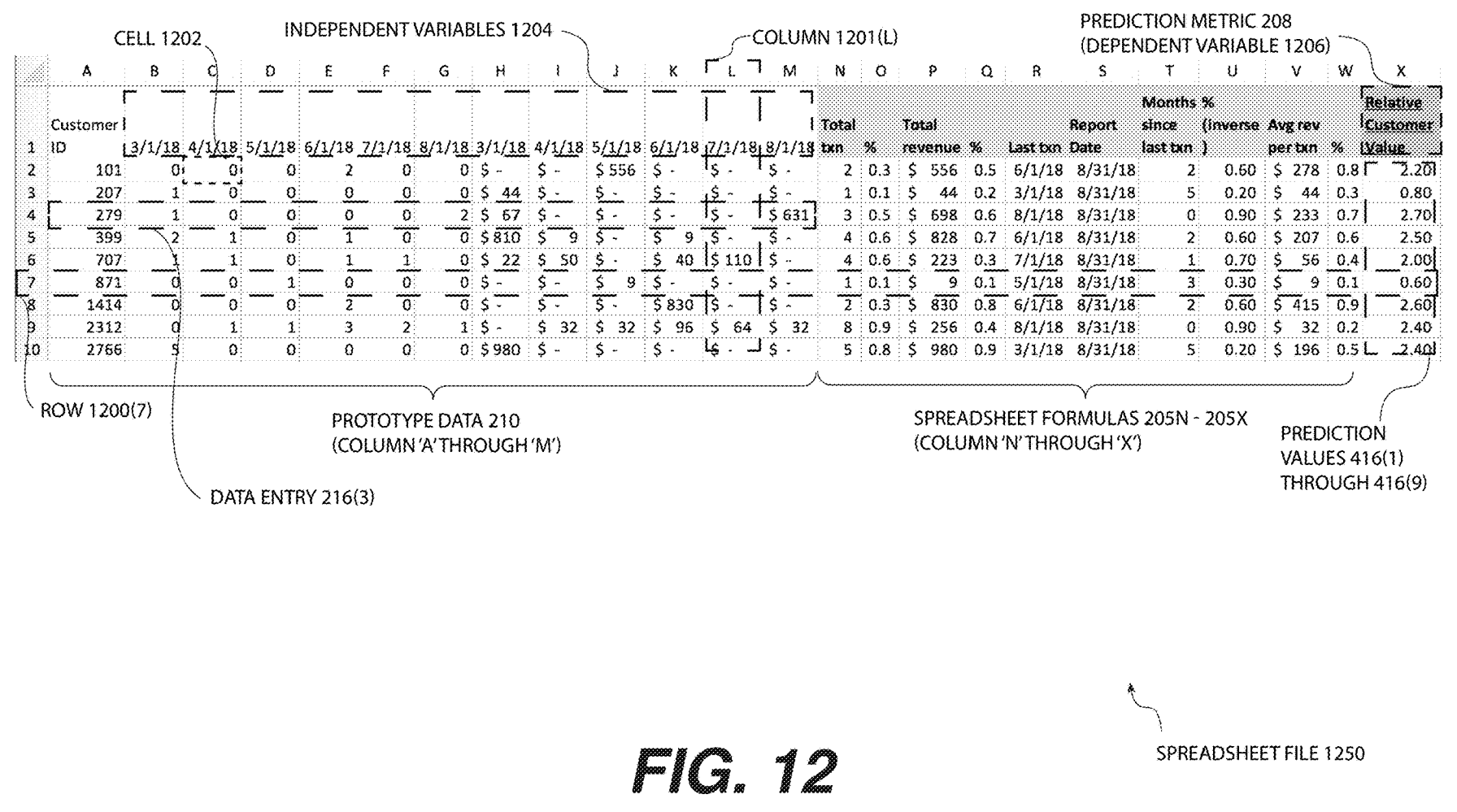

An example embodiment will now be described. FIG. 12 illustrates an example embodiment of a prototype data 210 comprising nine instances of the data entry 216 (e.g., the data entry 216(1) though 216(9)) comprising values for independent variables 1204 of data, the prototype data 210 (e.g., a subset of the dataset 214) utilized in a spreadsheet file 204 to model a prediction metric 208 that is a relative customer value score utilizing a set of spreadsheet formulas 205 to define the formula algorithm 206, according to one or more embodiments. In the embodiment of FIG. 12, a Microsoft® Excel spreadsheet file 204 is shown including a number of instances of a row 1200 (which may be numbered 1 through 10 in descending order, with rows 2 through 10 each storing data entry 216(1) through data entry 216(9), respectively) and a number of instances of a column 1201. An intersection of an instance of the row 1200 and an instance of the column 1201 forms a cell 1202, specifically shown in the embodiment of FIG. 12 as cell 'C2'. Row 1200(7), column 1201(L), and cell 1202(C2) are labeled.

The prototype data 210 is the data stored (e.g., which may be imported) as values in data entries 216 in rows 1 through 10 and columns A though M. Each cell 1202 within the prototype data 210 that is referenced by a spreadsheet formula 205 is a value of an independent variable 1204. The spreadsheet formulas 205N through 205X are defined in columns 1201(N) through 1201(X), respectively. Column 1201(X) defines the prediction metric 208, a relative customer value which is a dependent variable 1206 of the formula algorithm 206.

In the embodiment of FIG. 12, each of row 1200(2) through row 1200(10) represents a customer of the company. Column 1201(A) through column 1201(G) represent the six previous months with the number of transactions (e.g., sales) of the customer specified for each month. Column 1201(H) through column 1201(J) represent the six previous months with the revenue generated by the customer specified for each month. Utilizing the prototype date 210, the user 100 may build a model (e.g., as shown in columns 1201(N) through 1201(X)) to determine a relative value of each of the customers. FIG. 13 describes development and definition of the model comprised of spreadsheet formulas 205 that together comprise a formula algorithm 206.

FIG. 13 illustrates the spreadsheet formulas 205 of FIG. 12 and a resulting formula algorithm 206 from a model definition, according to one or more embodiments. A zoomed-in portion of the spreadsheet file 204 of FIG. 12 shows the cells 1202 holding the spreadsheet formulas 205 of FIG. 12. In the embodiment of FIG. 13, eleven cells 1202 per row 1200 are utilized to define the formula algorithm 206 outputting the prediction metric 208 in column 1201(X).

Spreadsheet formula 205N sums the total number of transactions in the last six months. Spreadsheet formula 205O determines a percentile of the number of transactions relative to other customer transactions by using the Excel PERCENTRANK.EX function. In the embodiment of FIG. 13, the spreadsheet formula 205O can draw reference to independent variables in other rows. For example, the spreadsheet formula 205O defined in cell 1202(O2) draws reference to all cells 1202 in column 1201(N) as independent variables as arguments to the PERCENTRANK.EX Excel function. However, in one or more other embodiments, data in other columns are transposed into each data entry 216 so they are accessible while retaining calculation-independence. Spreadsheet formula 205P sums the total revenue of each customer over the past six months. Spreadsheet formula 205Q determines percentile of customer revenue for each customer. Spreadsheet formula 205R determines the date of the last transaction. Spreadsheet formula 205S specified a report month by utilizing a month before the current month. Spreadsheet formula 205S calculates the number of months that have elapsed from the report month to the last transaction of the customer. Spreadsheet formula 205U calculates an inverse percentile of the months to the last transaction (where fewer months are given a higher value). Spreadsheet formula 205V calculates an average revenue per transaction. Spreadsheet formula 205W calculates a percentile of the average transaction revenue. Finally, Spreadsheet formula 205X, resulting in the prediction metric 208 that is the relative customer value, adds each of the percentiles to result in an evenly-weighted customer score based on, over the last six month: (a) total number of transactions; (b) total revenue; (c) months from last transaction; and (d) average revenue per transaction. Each formula algorithm 205 in FIG. 13 have references adjusted for each row 1200. For example, the formula algorithm 205N in cell 1202(N3) has a formula of 'SUM(B3:G3)'.

Below the zoomed-in portion of FIG. 12, the formula algorithm 206 of FIG. 12 is shown that is the combination of spreadsheet formula 205(N) through spreadsheet formula 205(X). Note that the formula algorithm 206 of FIG. 12 is shown in an idealized form to illustrate a complete compound formula defining the prediction metric 208 (Excel may not accept some of the reference, for example a SUM function within an { } array). However, it may still be translatable by the formula translation engine 302 and/or the parse tree generator 304.

In addition to independent variables, spreadsheet formulas, and dependent variables, cells can also contain, in one or more embodiments, an extra-spreadsheet instruction and/or an analysis instruction. The extra-spreadsheet instruction may be a word, phrase, or symbol, data, or other indicator stored in a cell that cause an action in one or more of the servers of FIG. 1. For example, by placing an email address in a cell a report and/or the output data 414 may be emailed directly to the email address. The analysis instruction may be a word, phrase, or symbol, data, or other indicator stored in a cell that cause one or more of the servers of FIG. 1 carry out a particular type of analysis without need for defining it in the spreadsheet formula 205 and/or the formula algorithm 206. For example, where the user 100 types "linear regression" into a cell, the model server 500 may automatically apply a linear regression to one or more data entries 216 associated with the analysis instruction.

FIG. 14 is an example of a spreadsheet file 204 that includes a number of instances of the spreadsheet formula 205A through spreadsheet formula 205D together constituting the formula algorithm 206 having four instances of the prediction metric 208 output in columns 1201(AS) through 1201(AV), according to one or more embodiments. The prediction metrics 208 may be modeled by a data analyst (e.g., the user 100) with a prototype data 210 of the dataset 214, according to one or more embodiments. In the embodiment of FIG. 14, a Microsoft® Excel spreadsheet file 204 is shown including a number of instances of a row 1200 (which may be numbered 1 through 19 in descending order, with rows 2 through 19 each storing one data entry 216(1) through data entry 216(18)) and a number of instances of a column 1201 (which may, moving from left to right, be designated 'A' through 'Z' and continue from 'AA' through 'AV').

The prototype data 210 may include data of all columns from 'A' through 'AR' ('A' through 'AN' are not shown in the example of FIG. 14). The prototype data 210 may be utilized as independent variables to be referenced as inputs by one or more spreadsheet formulas 205 of FIG. 14. The data of FIG. 14 may represent a sample of a larger dataset 214, specifically customer data of an enterprise. Each row 1200 may represent a customer of the enterprise, and each column 802 a type of data associated with that customer. For example, the column 'AO' may hold data for each customer specifying a last month the customer transacted with the enterprise. The cell 1202(AS) holds the formula 205AS that may be a prediction metric 208A representing a number of predicted transactions that the customer may engage in (e.g., purchases, service requests, etc.) in a given period of time. For example, the column 1201 that is the 'AS' column may be a spreadsheet formula 205 that models the number of predicted customer transactions in the next six months. The user 100 may have composed the spreadsheet formula 205AS to predict (e.g., to model) the behavior of each customer based on the data in the cells of columns 'A' through 'AR'. In the embodiment of FIG. 14, the spreadsheet formula 205A only draws references to other cells within the row '2' (e.g., 'AK2'), and a static constant value in cell 'AJ35' not shown in the embodiment of FIG. 14.

The embodiment of FIG. 14 demonstrates one instance of a syntax format. In the syntax format utilized in FIG. 14, the syntax format confines data of each data entry 216 to a row of the spreadsheet file 204, with each instance of a cell of the row comprising a null, an independent variable, a dependent variable, and/or a spreadsheet formula. In the embodiment of FIG. 14, the independent variables of each row are defined in columns 'A' through AR', the spreadsheet formulas 205 defined in columns 'AS' through 'AV', and the dependent variable is the prediction metric 208 that is the output of columns 'AS' through 'AV' shown as the result of the application of the spreadsheet formulas 205. The spreadsheet algorithm is the collection of spreadsheet formulas 205, in this embodiment of FIG. 14 resulting in several dependent variable outputs. The syntax format of FIG. 14 further confines to the row 1200 of the spreadsheet file 204 the one or more spreadsheet formulas 205 comprising the formula algorithm 206. For example, the formula algorithm 206 defined in cells of row 1200(2) only draws references to other cells within row 2, and the formula algorithm 206 defined in cells of row 3 only draws references to other cells within row 3. The syntax format of FIG. 14 further exclusively draws each instance of a reference of each of the one or more spreadsheet formulas 205 to a preceding cell within the row. For example, the cell 'AV2' can only reference a cell in row 2, and only reference a column within that row that is between and including 'A' through 'AU'. In this case, if values of independent variables are needed from other rows, the values can be incorporated into the data entry 216, for example as a transposed column that is fit entirely into the row.

Alternatively, another syntax may be a transpose wherein the syntax format: (i) confines data of each data entry 216 to a column of the spreadsheet file 204, with each instance of a cell of the column comprising at least one of a null, an independent variable, a dependent variable, and a spreadsheet formula 205; (ii) confines to the column of the spreadsheet file 204 the one or more spreadsheet formulas 205 comprising the formula algorithm 206, and (iii) exclusively drawing each instance of a reference of each of the one or more spreadsheet formulas 205 to a preceding cell within the column.

FIG. 15 is an example of the translation of the spreadsheet formula 205A of FIG. 14 into a programming language (the transformation referred to in FIG. 15 as the extrapolated algorithm 322A) of spreadsheet formula 205AS. In one or more other embodiments, each of the four spreadsheet formulas 205 of FIG. 14 may result in a single instance of the extrapolated algorithm 322 with four dependent variables as predication metric 208A through prediction metric 208D. Specifically, FIG. 15 illustrates generation of Scala code to be applied against an Apache® Spark Cluster (e.g., the computing cluster 450 of FIG. 4), according to one or more embodiments. The spreadsheet formula 205A of FIG. 15 is shown as data after extraction from the spreadsheet file 204 (e.g., by the formula algorithm extraction engine 305), and the extrapolated algorithm 322A corresponding to the spreadsheet formula 205A (e.g., output by the code generation engine 318). The transformation of FIG. 15 may be effected, for example, by operation 718, operation 900, and/or operation 1000. In FIG. 15, the output language of the extrapolated algorithm 322A is Scala to be run against a Spark server cluster (e.g., the computing cluster 450 of FIG. 4).

FIG. 16 illustrates an interface for receiving the dataset 214 and the spreadsheet file 204 having the formula algorithm 206 to submission to the translation server 300 of FIG. 3, the execution server 400 of FIG. 4, and/or the model server 500 of FIG. 5, according to one or more embodiments. Interface 1600 demonstrates a web interface in which the user 100 (e.g., an analyst) can submit the prototype data 210 that includes the formula algorithm 206 and a limited subset of the dataset 214 (e.g., 20 rows as instances of the data entry 216) by uploading a file to the upload interface 1602, which may be an Excel file. The user 100 may then upload the dataset 214 in the upload interface 1604, which may be a .csv file containing a large dataset (e.g., 43,371 instances of the data entry 216). When both files are uploaded the user 100 may then select 'run analysis' for the formula algorithm 206 to be extracted, converted to the extrapolated algorithm 322, and applied to the dataset 214. Interface 1601 illustrated completion of the upload process and an execution status 1606 indicator shows the user a progress of generation of the output data 414. Following completion, the user 100 may be presented with the option to download the output data 414, to store the output data 414 in a remote server, and/or to apply post-processing to the output data 414, for example the visualization illustrated in FIG. 17. In one or more embodiments, other ways to accomplish the interface include a plugin (e.g., of the spreadsheet application 202), a desktop application, and/or a microservice with an API.

FIG. 17 is an example of the output data 414 including the prediction values 416 resulting from the application of the extrapolated algorithm 322A of FIG. 15 to the dataset 214, the output data 414 permitting the user 100 having spreadsheet skill to view, work with, analyze and/or derive intelligence from the large instance of the dataset 214 of the Spark Cluster (e.g., shown in the example of FIG. 15 as 43,371 entries), including insight empowering the user 100 to refine and/or tune the spreadsheet formula 205A (e.g., which may therefore modify the overall formula algorithm 206) to improve a data model and/or prediction metric 208A, according to one or more embodiments. FIG. 17 further illustrates the post-production data 411 that in this case may be a sorting and/or arrangement of the most common prediction value (e.g., the prediction value 416 that is the number of transactions the customer is expected to transact in within the next six months). FIG. 17 further illustrates a visualization data 412 that is a pie chart displaying relative percentages of each prediction value 416).

Although the present embodiments have been described with reference to specific example embodiments, it will be evident that various modifications and changes may be made to these embodiments without departing from the broader spirit and scope of the various embodiments. For example, the various devices and algorithms described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the client device 200, the translation server 300, the execution server 400, the computing cluster 450, and the model server 500). Accordingly, the specification and drawings are to be regarded in an illustrative rather than a restrictive sense.

The structures and modules in the figures may be shown as distinct and communicating with only a few specific structures and not others. Each element of each data processing system (e.g., the client device 200, the translation server 300, the execution server 400, the computing cluster 450, and the model server 500) is communicatively coupled with each other element, even if bidirectional arrows are not shown in the figures. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other embodiments are within the scope of the preceding disclosure.

What is claimed is:

1. A method of scaling spreadsheet data analysis, the method comprising:
 processing a spreadsheet file comprising a formula algorithm to be applied to a dataset comprising two or more data entries, the formula algorithm outputting a dependent variable and accepting as inputs one or more independent variables,
  wherein the formula algorithm comprising one or more spreadsheet formulas stored in a first set of one or more cells of the spreadsheet file, the one or more independent variables referenced from the first set of one or more cells of the spreadsheet file, and the dependent variable output in a cell of the spreadsheet file,
 generating from the formula algorithm an extrapolated algorithm expressed in a programming language that is at least one of a query language, an interpreted programming language, and a functional programming language,
  wherein each of the one or more spreadsheet formulas equivalent to one or more functions of the programming language and each of the one or more independent variables define a declared variable of at least one of the one or more functions of the programming language;
verifying calculation independence of a data entry of the dataset when the extrapolated algorithm to be applied to two or more data entries of the dataset is applied to the data entry;
determining the data entry of the two or more data entries references data of a different data entry of the two or more data entries;
replicating the data of the different data entry into the data entry to ensure calculation independence of the data entry; and
applying the extrapolated algorithm against the dataset utilizing parallel processing to generate an output data comprising a value for the dependent variable calculated for each of the two or more data entries of the dataset.

2. The method of claim 1, further comprising:
provisioning at least one of a computing virtual machine and a computing process container;
storing the output data in at least one of the computing virtual machine and the computing process container; and
communicatively coupling the computing process container to an application programming interface (API) of a visualization application.

3. The method of claim 2, wherein the spreadsheet file is accessed as a software-as-a-service through a browser application.

4. The method of claim 3, further comprising:
processing an extra-spreadsheet instruction stored in a third set of one or more cells of the spreadsheet file to at least one of run a data analysis, report the output data to a user, parametrize the formula algorithm, and parameterize at least one of the one or more independent variables.

5. The method of claim 4, further comprising:
running an automatic machine learning process to automatically apply one or more predictive models to the dataset;
determining a predictive model of the one or more predictive models fits the dataset;
modifying the extrapolated algorithm in response to an application of the one or more predictive models to the dataset to result in a modified extrapolated algorithm; and
reapplying the modified extrapolated algorithm against the dataset to adjust a data model for analyzing the dataset.

6. The method of claim 5, wherein the calculation independence based on a syntax format comprising:
(i) confining data of the data entry to a row of the spreadsheet file, with each instance of a cell of the row comprising at least one of a null, an independent variable of the one or more independent variables, the dependent variable, a spreadsheet formula of the one or more spreadsheet formulas, the extra-spreadsheet instruction, and an analysis instruction, and
(ii) confining to the row of the spreadsheet file the one or more spreadsheet formulas comprising the formula algorithm.

7. The method of claim 6,
wherein the output data re-combined from data comprising a first output block generated through parallel processing resulting in one or more additional output blocks, and where the programming language comprises a structured query language (SQL), and
wherein a format of the spreadsheet file is at least one of: .123, .12M, ._XLS, ._XLSX, .AST, .AWS, .BKS, .CELL, .DEF, .DEX, .DFG, .DIS, .EDX, .EDXZ, .ESS, .FCS, .FM, .FODS, .FP, .GNM, .GNUMERIC, .GSHEET, .HCDT, .IMP, .MAR, .NB, .NCSS, .NMBTEMPLATE, .NUMBERS, .NUMBERS-TEF, .ODS, .OGW, .OGWU, .OTS, .PMD, .PMDX, .PMV, .PMVX, .QPW, .RDF, .SDC, .STC, .SXC, .TMV, .TMVT, .UOS, .WKI, .WKQ, .WKS, .WKU, .WQ1, .WQ2, .WR1, .XAR, .XL, .XLR, .XLS, .XLSB, .XLSHTML, .XLSM, .XLSMHTML, .XLSX, .XLTHTML, .XLTM, and .XLTX.

8. A method for scalable iterative data analysis utilizing a spreadsheet, the method comprising:
processing a spreadsheet file comprising:
a prototype data comprising a data entry imported from a dataset comprising two or more data entries, the data entry comprising one or more pieces of data, and
a formula algorithm defining a data model for analyzing the dataset,
wherein the formula algorithm outputting a dependent variable and accepting as inputs the one or more pieces of data of the data entry as one or more independent variables, and
wherein the formula algorithm comprising one or more spreadsheet formulas stored in one or more cells of the spreadsheet file, the one or more independent variables referenced from one or more cells of the spreadsheet file, and the dependent variable output in a cell of the spreadsheet file;
recognizing a syntax format with which the formula algorithm is organized in the spreadsheet file,
wherein the one or more spreadsheet formulas, the one or more independent variables, and the dependent variable are stored to permit independent calculation of the dependent variable for each of the two or more data entries of the dataset;
generating from the formula algorithm a first extrapolated algorithm expressed in one or more programming languages,
wherein each spreadsheet formula equivalent to one or more functions of the at least one of the one or more programming languages and each of the one or more independent variables define a declared variable of at least one of the one or more functions of at least one of the one or more programming languages;
applying the first extrapolated algorithm against the dataset utilizing parallel processing to generate an output data comprising a value for the dependent variable calculated for each of the two or more data entries of the dataset;
receiving an update to at least one of the formula algorithm and the first extrapolated algorithm to generate a modified extrapolated algorithm adjusting the data model for analyzing the dataset; and
reapplying the modified extrapolated algorithm against the dataset.

9. The method of claim 8, further comprising:
applying an automatic machine learning algorithm to generate a second extrapolated algorithm; and applying the second extrapolated algorithm against the dataset utilizing parallel processing to generate a different output data.

10. The method of claim 8, further comprising:
continuously reapplying the first extrapolated algorithm against the dataset to update the output data as the dataset evolves; and
transmitting at least one of the output data and a visualization data of the output data to a client device of a user.

11. The method of claim 10,
wherein reapplying the first extrapolated algorithm against the dataset to update the output data occurring at a time interval,
wherein the one or more programming languages comprising at least one of a query language, an interpreted programming language, and a functional programming language, and
wherein the syntax format is a pre-agreed syntax and the spreadsheet file comprises a template.

12. The method of claim 8, further comprising:
processing an extra-spreadsheet instruction stored in one or more cells of the spreadsheet file to at least one of run a data analysis, report the output data to the user, parametrize the formula algorithm, and parametrize at least one of the one or more independent variables;
running an automatic machine learning process to automatically apply one or more predictive models to the dataset;
determining a predictive model of the one or more predictive models fits the dataset;
modifying the first extrapolated algorithm in response to an application of one or more predictive models to the dataset to result in a third extrapolated algorithm;
re-submitting the third extrapolated algorithm for parallel processing;
specifying a first computation block comprising one or more data entries of the dataset;
extracting from the dataset each of the one or more data entries within the first computation block;
submitting the first computation block and the first extrapolated algorithm for parallel processing; and
receiving the output data re-combined from data comprising a first output block and one or more additional output blocks.

13. The method of claim 12, wherein the syntax format comprises:
(i) confining data of the data entry to a row of the spreadsheet file, with each instance of a cell of the row comprising at least one of a null, an independent variable of the one or more independent variables, the dependent variable, a spreadsheet formula of the one or more spreadsheet formulas, the extra-spreadsheet instruction, and an analysis instruction, and
(ii) confining to the row of the spreadsheet file the one or more spreadsheet formulas comprising the formula algorithm.

14. The method of claim 10,
wherein at least one of the one or more programming languages comprises a structured query language (SQL), and
wherein a format of the spreadsheet file is at least one of: .123, .12M, ._XLS, ._XLSX, .AST, .AWS, .BKS, .CELL, .DEF, .DEX, .DFG, .DIS, .EDX, .EDXZ, .ESS, .FCS, .FM, .FODS, .FP, .GNM, .GNUMERIC, .GSHEET, .HCDT, .IMP, .MAR, .NB, .NCSS, .NMB-TEMPLATE, .NUMBERS, .NUMBERS-TEF, .ODS, .OGW, .OGWU, .OTS, .PMD, .PMDX, .PMV, .PMVX, .QPW, .RDF, .SDC, .STC, .SXC, .TMV, .TMVT, .UOS, .WKI, .WKQ, .WKS, .WKU, .WQ1, .WQ2, .WR1, .XAR, .XL, .XLR, .XLS, .XLSB, .XLSHTML, .XLSM, .XLSMHTML, .XLSX, .XLTHTML, .XLTM, and .XLTX.

15. A system for scalable application of a data model defined in a spreadsheet to a dataset, the system comprising:
a translation server comprising:
 a processor of the translation server;
 a memory of the translation server, the memory of the translation server comprising computer readable instructions that when executed on the processor of the translation server:
  receive a spreadsheet file comprising a formula algorithm and a data entry of the two or more data entries of the dataset,
   wherein the formula algorithm comprising one or more spreadsheet formulas stored in one or more cells of the spreadsheet file, one or more pieces of data of the data entry stored as one or more independent variables referenced from one or more cells of the spreadsheet file, and a dependent variable output in a cell of the spreadsheet file, and
   wherein the one or more spreadsheet formulas, the one or more independent variables, and the dependent variable permit independent calculation of a value of the dependent variable at least one of the two or more data entries of the dataset;
  generate an extrapolated algorithm expressed in a programming language based on the formula algorithm,
   wherein each instance of the one or more spreadsheet formulas equivalent to one or more functions of the programming language; and
  submit the extrapolated algorithm for calculation of the value of the dependent variable for each of the two or more data entries of the dataset through parallel processing,
an execution server comprising:
 a processor of the execution server,
 a memory of the execution server, the memory of the execution server comprising computer readable instructions that when executed on the processor of the execution server:
  receive the extrapolated algorithm expressed in the programming language;
  receive the dataset comprising the two or more data entries as an input to the extrapolated algorithm;
  verify calculation independence of the extrapolated algorithm to be applied against the dataset;
  apply the extrapolated algorithm against the dataset; and
  generate an output data comprising the value for the dependent variable of each instance of the two or more data entries within the dataset; and
a network communicatively coupling the translation server and the execution server.

16. The system of claim 15, wherein the execution server further comprising:
an iteration engine comprising computer readable instructions that when executed on the processor of the execution server:
 receive an update to at least one of the formula algorithm and the extrapolated algorithm adjusting the data model for analyzing the dataset resulting in generation of a modified extrapolated algorithm; and
reapply the modified extrapolated algorithm against the dataset.

17. The system of claim 15, wherein the execution server further comprising:
an iteration engine comprising computer readable instructions that when executed on the processor of the execution server:
continuously reapply the extrapolated algorithm against the dataset to update the output data as the dataset evolves.

18. The system of claim 17, wherein the memory of the translation server further comprising computer readable instructions that when executed on the processor of the translation server:
determine at least one of a spreadsheet format of the spreadsheet file and a syntax format of the spreadsheet file;
extract from the spreadsheet file and store in the memory of the translation server the one or more spreadsheet formulas comprising the formula algorithm, the one or more independent variables, and the dependent variable; and
combine each of the one or more spreadsheet formulas into the formula algorithm and store the formula algorithm in the memory of the translation server.

19. The system of claim 18, further comprising:
a computing device comprising a memory of the computing device storing the dataset comprising two or more data entries,
a client device comprising:
a processor of the client device, and
a memory of the client device storing at least one of a spreadsheet application for reading the spreadsheet file and a browser application for accessing the spreadsheet file as a software-as-a-service,
a model server comprising:
a processor of the of the model server,
a memory of the model server, the memory of the model server comprising computer readable instructions that when executed on the processor of the model server:
run an automatic machine learning process to automatically apply one or more predictive models to the dataset;
determine a predictive model of the one or more predictive models fits the dataset;
modify the extrapolated algorithm in response to an application of one or more predictive models to the dataset to result in a second extrapolated algorithm; and
re-submit the second extrapolated algorithm for parallel processing over the network, and
wherein the spreadsheet file is at least one of (i) readable by the spreadsheet application running on the client device communicatively coupled to the network and (ii) accessible as the software-as-a-service through the browser application running on the client device communicatively coupled to the network, and
wherein the memory of the translation server further comprising computer readable instructions that when executed on the processor of the translation server:
parse the dataset as an external data source to result in an instance of the data entry;
map the instance of the data entry to one or more cells of the spreadsheet file; and
import the instance of the data entry into the spreadsheet file as a prototype data.

20. The system of claim 19,
wherein the programming language comprises a structured query language (SQL),
wherein a format of the spreadsheet file is at least one of: .123, .12M, ._XLS, ._XLSX, .AST, .AWS, .BKS, .CELL, .DEF, .DEX, .DFG, .DIS, .EDX, .EDXZ, .ESS, .FCS, .FM, .FODS, .FP, .GNM, .GNUMERIC, .GSHEET, .HCDT, .IMP, .MAR, .NB, .NCSS, .NMBTEMPLATE, .NUMBERS, .NUMBERS-TEF, .ODS, .OGW, .OGWU, .OTS, .PMD, .PMDX, .PMV, .PMVX, .QPW, .RDF, .SDC, .STC, .SXC, .TMV, .TMVT, .UOS, .WKI, .WKQ, .WKS, .WKU, .WQ1, .WQ2, .WR1, .XAR, .XL, .XLR, .XLS, .XLSB, .XLSHTML, .XLSM, .XLSMHTML, .XLSX, .XLTHTML, .XLTM, and .XLTX,
wherein a format of the dataset is at least one of: .CSV, .TSV, .XLS, .XLSX, .JSON, .XML, a Parquet File Format, an Avro file format, and
wherein the syntax format comprises:
(i) confining data of the data entry to a row of the spreadsheet file, with each instance of a cell of the row comprising at least one of a null, an independent variable of the one or more independent variables, the dependent variable, a spreadsheet formula of the one or more spreadsheet formulas, an extra-spreadsheet instruction, and an analysis instruction, and
(ii) confining to the row of the spreadsheet file the one or more spreadsheet formulas comprising the formula algorithm.

* * * * *